United States Patent
Tsai et al.

(10) Patent No.: US 11,141,715 B2
(45) Date of Patent: Oct. 12, 2021

(54) METHOD FOR FABRICATING HETEROGENEOUS NICKEL-BASED CATALYST ON ALUMINUM OXIDE SUPPORT, HETEROGENEOUS NICKEL-BASED CATALYST ON ALUMINUM OXIDE SUPPORT AND METHOD FOR SYNTHESIZING POLYETHERAMINE

(71) Applicants: Chang Chun Petrochemical Co., LTD., Taipei (TW); Chang Chun Plastics Co., LTD., Taipei (TW); Dairen Chemical Corp., Taipei (TW); National Tsing Hua University, Hsinchu (TW)

(72) Inventors: De-Hao Tsai, Zhubei (TW); Hung-Yen Chang, Taoyuan (TW); Guan-Hung Lai, Huwei Township (TW); Chih-Yuan Lin, Taipei (TW); Chun-Yu Lee, Taipei (TW); Chih-Cheng Chia, Taipei (TW); Chuen-Lih Hwang, Taipei (TW); Huan-Ming Chang, Taipei (TW)

(73) Assignees: National Tsing Hua University, Hsinchu (TW); Chang Chun Plastics Co., Ltd., Taipei (TW); Chang Chun Petrochemical Co., Ltd., Taipei (TW); Darien Chemical Corp., Taipei (TW)

( * ) Notice: Subject to any disclaimer, the term of this patent is extended or adjusted under 35 U.S.C. 154(b) by 27 days.

(21) Appl. No.: 16/407,770

(22) Filed: May 9, 2019

(65) Prior Publication Data
US 2020/0139350 A1  May 7, 2020

(30) Foreign Application Priority Data
Nov. 6, 2018 (TW) .................. 107139368

(51) Int. Cl.
*B01J 23/83* (2006.01)
*B01J 37/02* (2006.01)
(Continued)

(52) U.S. Cl.
CPC ............ *B01J 23/83* (2013.01); *B01J 21/04* (2013.01); *B01J 23/755* (2013.01);
(Continued)

(58) Field of Classification Search
CPC .......... B01J 21/04; B01J 37/0201–0213; B01J 37/12; B01J 37/14; B01J 23/755;
(Continued)

(56) References Cited

U.S. PATENT DOCUMENTS 5,352,835 A * 10/1994 Dai ................. C07C 213/02
502/245
2011/0137029 A1* 6/2011 Kubanek ............ C07C 209/26
544/106
(Continued)

FOREIGN PATENT DOCUMENTS

TW  201129527 A  9/2011

*Primary Examiner* — Kregg T Brooks

(57) ABSTRACT

The present disclosure provides a method for fabricating a heterogeneous nickel-based catalyst on an aluminum oxide support. The method includes a solution preparation step, a drop-cast step, a first calcining step, and a second calcining step. The solution preparation step is provided for preparing a precursor solution. The drop-cast step is provided for dropping the precursor on the support. The first calcining step is provided for obtaining an oxidation state catalyst. The second calcining step is provided for obtaining the heterogeneous nickel-based catalysts on aluminum oxide support.

12 Claims, 19 Drawing Sheets

(51) Int. Cl.
*B01J 37/08* (2006.01)
*B01J 37/18* (2006.01)
*B01J 21/04* (2006.01)
*C08G 65/325* (2006.01)
*B01J 35/02* (2006.01)
*B01J 35/10* (2006.01)
*B01J 35/00* (2006.01)
*B01J 23/755* (2006.01)

(52) U.S. Cl.
CPC ......... *B01J 35/0053* (2013.01); *B01J 35/023* (2013.01); *B01J 35/1019* (2013.01); *B01J 35/1061* (2013.01); *B01J 37/0207* (2013.01); *B01J 37/0213* (2013.01); *B01J 37/08* (2013.01); *B01J 37/18* (2013.01); *C08G 65/3255* (2013.01)

(58) Field of Classification Search
CPC . B01J 23/83; B01J 37/08; B01J 37/18; C08G 65/3255
See application file for complete search history.

(56) References Cited

U.S. PATENT DOCUMENTS

| | | | |
|---|---|---|---|
| 2013/0184360 A1* | 7/2013 | Eri | ........................ B01J 23/8913 518/715 |
| 2019/0201878 A1* | 7/2019 | Ren | .......................... B01J 23/44 |

* cited by examiner

200 a heterogeneous nickel-based catalyst on an aluminum oxide support is provided — 210 a reductive amination reaction of polypropylene glycol step is performed — 220

Example 1

Example 2

Example 3

Example 4

1

2

−H₂O

3

+H₂

4

5

METHOD FOR FABRICATING HETEROGENEOUS NICKEL-BASED CATALYST ON ALUMINUM OXIDE SUPPORT, HETEROGENEOUS NICKEL-BASED CATALYST ON ALUMINUM OXIDE SUPPORT AND METHOD FOR SYNTHESIZING POLYETHERAMINE

RELATED APPLICATIONS

This application claims priority to Taiwan Application Serial Number 107139368, filed Nov. 6, 2018, which is herein incorporated by reference.

BACKGROUND

Technical Field

The present disclosure relates to a method for fabricating catalysts. More particularly, the present disclosure relates to a method for fabricating a heterogeneous nickel-based catalyst on an aluminum oxide support, a heterogeneous nickel-based catalyst on an aluminum oxide support thereof and a method for synthesizing polyetheramine thereof.

Description of Related Art

Polyetheramines (PEA) are the important chemical raw materials and extensively used as intermediates for the production of petrochemicals, such as household chemicals, pesticides and pharmaceuticals. The reductive amination reaction of polypropylene glycol (PPG) is catalyzed by the heterogeneous catalysts so as to produce polyetheramines with the desired selectivity recognized as one of the effective production routes.

At the present, the heterogeneous catalysts are considered as a key technology for the production of the high-value petrochemical products, which are beneficial as the industrial-scale production materials. Among many catalysts, the nickel-based catalysts are extensively considered as one of the ideal catalyst materials due to the characteristics, such as high activity, high selectivity and low cost. Now, Raney nickel is mainly used as the catalyst, but the long-term stability of Raney nickel is not good.

Therefore, how to prepare the composite heterogeneous catalysts so as to achieve high activity, high selectivity and high stability for catalyzing the reductive amination reaction of polypropylene glycol (PPG) is the goal of the relevant industry.

SUMMARY

According to one aspect of the present disclosure, a method for fabricating a heterogeneous nickel-based catalyst on an aluminum oxide support includes steps as follows. A solution preparation step is performed, wherein a catalytically active precursor is used as a precursor solution, and the precursor solution contains a nickel ion. A drop-cast step is performed, wherein the precursor solution is dropped on a support so as to obtain a catalyst precursor, and the support is an aluminum oxide support. A first calcining step is performed, wherein the catalyst precursor is calcined so as to obtain an oxidation state catalyst. A second calcining step is performed, wherein the oxidation state catalyst is calcined under a reducing gas so as to obtain the heterogeneous nickel-based catalyst on the aluminum oxide support, and the reducing gas is hydrogen.

According to another aspect of the present disclosure, a heterogeneous nickel-based catalyst on an aluminum oxide support is provided. The heterogeneous nickel-based catalyst on the aluminum oxide support is fabricated by the method according to the aforementioned aspect.

According to further another aspect of the present disclosure, a method for synthesizing polyetheramine includes steps as follows. A heterogeneous nickel-based catalyst on an aluminum oxide is provided, wherein the heterogeneous nickel-based catalyst on the aluminum oxide is fabricated by the method according to the aforementioned aspect. A reductive amination reaction of polypropylene glycol step is performed, wherein polypropylene glycol is performed the reductive amination reaction by the heterogeneous nickel-based catalyst on the aluminum oxide support used as a catalyst so as to obtain polyetheramine at an environment contained hydrogen and ammonia.

BRIEF DESCRIPTION OF THE DRAWINGS

The present disclosure can be more fully understood by reading the following detailed description of the embodiment, with reference made to the accompanying drawings as follows.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

Figure 1:
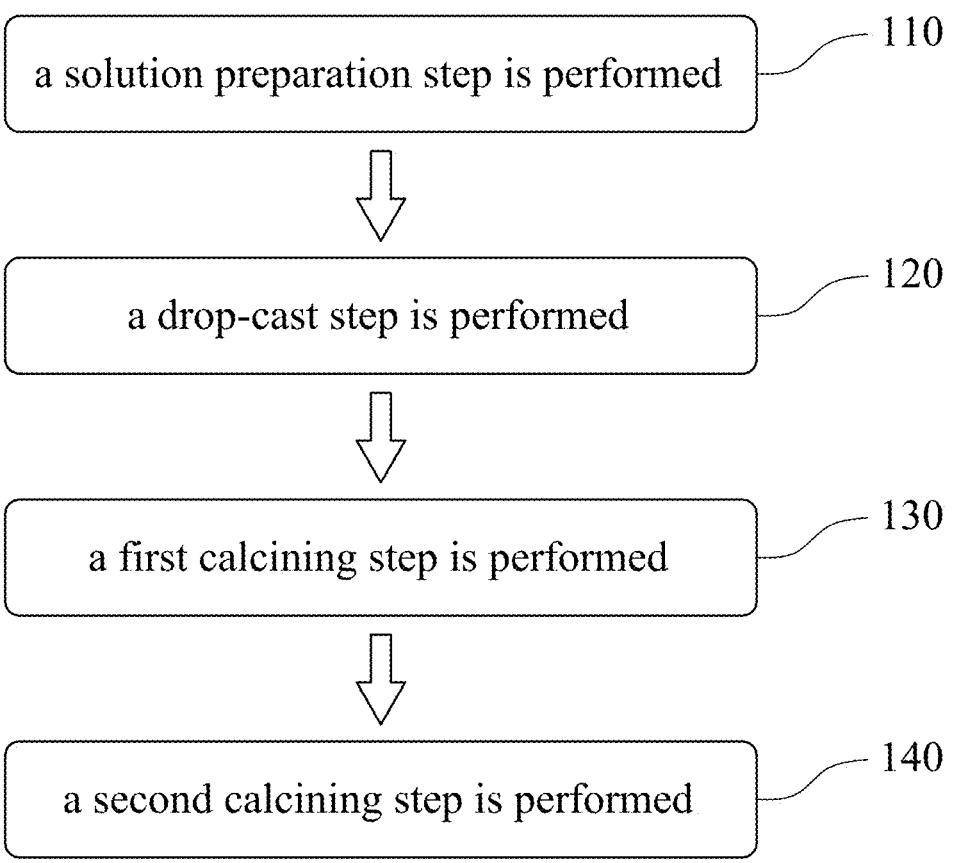
FIG. 1 is a flow chart of a method for fabricating a heterogeneous nickel-based catalyst on an aluminum oxide support according to one embodiment of the present disclosure.

Please refer to FIG. 1, which is a flow chart of a method for fabricating a heterogeneous nickel-based catalyst on an aluminum oxide support 100 according to one embodiment of the present disclosure. It should be noted that the method for fabricating the heterogeneous nickel-based catalyst on the aluminum oxide support is mainly prepared by the incipient wetness impregnation. The method for fabricating the heterogeneous nickel-based catalyst on the aluminum oxide support 100 includes a step 110, a step 120, a step 130 and a step 140.

First, in the step 110, a solution preparation step is performed, wherein a catalytically active precursor is used as a precursor solution, and the precursor solution contains a nickel ion. Specifically, the catalytically active precursor can be a nickel nitrate solution or a cerium nitrate solution, and the precursor solution can be the nickel nitrate solution or a mixed solution of nickel nitrate and cerium nitrate. The heterogeneous nickel-based catalyst on the aluminum oxide support is prepared by the different type and the different concentration composition of the precursor solution.

Next, in the step 120, a drop-cast step is performed, wherein the precursor solution is dropped on a support so as to obtain a catalyst precursor, and the support is an aluminum oxide support. The aluminum oxide support is dried at a temperature of 353 K to 393 K first, and reserved overnight.

In the step 130, a first calcining step is performed, wherein the catalyst precursor is calcined so as to obtain an oxidation state catalyst, and the temperature of the first calcining step can range from 300° C. to 400° C.

Then, in the step 140, a second calcining step is performed, wherein the oxidation state catalyst is calcined under a reducing gas so as to obtain the heterogeneous nickel-based catalyst on the aluminum oxide support, and the reducing gas is hydrogen. The temperature of the second calcining step can range from 250° C. to 400° C. Furthermore, after the second calcining step, a passivation step can be further included. The heterogeneous nickel-based catalyst on the aluminum oxide support is cooled at the temperature of 200° C. to 400° C. with nitrogen, and then passivated at the temperature of 180° C. to 220° C. by introducing an air.

Therefore, the present disclosure further provides the heterogeneous nickel-based catalyst on the aluminum oxide support fabricated by the aforementioned method, which can be used to catalyze the reductive amination reaction of polypropylene glycol to synthesize polyetheramine. Furthermore, the heterogeneous nickel-based catalyst on the aluminum oxide support further includes adding CeO$_2$ as a co-catalyst. The addition of the co-catalyst component to the catalyst can cause the concerted reaction at the interface between the metal and the support so as to enhance the activity and the stability of the catalyst. Then the heterogeneous nickel-based catalyst on the aluminum oxide support can be prepared by controlling a Ni concentration and a Ce concentration, wherein the heterogeneous nickel-based catalyst on the aluminum oxide support can be a nickel catalyst on the aluminum oxide support (hereinafter referred to as Ni@Al$_2$O$_3$) or a nickel-cerium oxide catalyst on the aluminum oxide support (hereinafter referred to as Ni—CeO$_2$@Al$_2$O$_3$). A range of the Ni concentration of the Ni@Al$_2$O$_3$ can be greater than 0 wt % and less than or equal to 40 wt %. The range of the Ni concentration of the Ni—CeO$_2$@Al$_2$O$_3$ can be greater than 0 wt % and less than or equal to 25 wt %, and the range of the Ce concentration can be greater than 0 wt % and less than or equal to 25 wt %.

Hereinafter, a method for synthesizing polyetheramine 200 using the aforementioned heterogeneous nickel-based catalyst on the aluminum oxide support will be further described with FIG. 2. The method for synthesizing polyetheramine 200 includes a step 210 and a step 220.

First, in the step 210, the heterogeneous nickel-based catalyst on the aluminum oxide support is provided, wherein the heterogeneous nickel-based catalyst on the aluminum oxide support can be the Ni@Al$_2$O$_3$ and the Ni—CeO$_2$@Al$_2$O$_3$.

Next, in the step 220, a reductive amination reaction of polypropylene glycol step is performed, wherein polypropylene glycol is performed the reductive amination reaction by the aforementioned heterogeneous nickel-based catalyst on the aluminum oxide support used as the catalyst, so as to obtain polyetheramine at an environment contained hydrogen and ammonia. A molar ratio of hydrogen (H$_2$) to polypropylene glycol (PPG) can be range from 1 to 1.5, and a molar ratio of ammonia (NH$_3$) to polypropylene glycol (PPG) can be range from 38 to 40.6. The details of the step 220 will be described in the subsequent embodiments, and will not be described herein.

Hereinafter, the specific examples and the comparative examples are described to explain the detail of the heterogeneous nickel-based catalyst on the aluminum oxide support, the preparation method thereof, and the method for synthesizing polyetheramine thereof used to achieve the effects which are provided in the present disclosure.

Example

1. A Material Properties Analysis of a Heterogeneous Nickel-Based Catalyst on an Aluminum Oxide Support A heterogeneous nickel-based catalyst on an aluminum oxide support of the present disclosure is prepared by a step 110 to a step 140 of a method for fabricating a heterogeneous nickel-based catalyst on an aluminum oxide support 100 of FIG. 1. First, a catalytically active precursor is prepared as a precursor solution. The catalytically active precursor of the present disclosure is a nickel nitrate solution or a cerium nitrate solution, and the precursor solution is the nickel nitrate solution or a mixed solution of nickel nitrate and cerium nitrate.

Next, the aforementioned precursor solution is used a drop-cast to load on the aluminum oxide support so as to obtain a catalyst precursor, wherein the aluminum oxide support is dried at a temperature of 373K first, and reserved overnight. Then, the catalyst precursor is calcined at 350° C. for 3 hours under an air, and calcined at 250° C. or 400° C. for 1 hour under hydrogen so as to obtain the heterogeneous nickel-based catalyst on the aluminum oxide support. After the second calcination, the heterogeneous nickel-based catalyst on the aluminum oxide support is cooled at the temperature of 200° C. to 400° C. with nitrogen, and passivated at the temperature of 200° C. by introducing the air. The heterogeneous nickel-based catalyst on the aluminum oxide support fabricated by the aforementioned method can be a nickel catalyst on the aluminum oxide support (hereinafter referred to as Ni@Al$_2$O$_3$) or a nickel-cerium oxide catalyst on the aluminum oxide support (hereinafter referred to as Ni—CeO$_2$@Al$_2$O$_3$).

The heterogeneous nickel-based catalyst on the aluminum oxide support of the present disclosure can be controlled the crystallite size of the active metal and the metal surface area by controlling the composition (the type of the precursor and the concentration) and the operating condition (the calcining temperature) to achieve the high catalytic activity, the selectivity and the stability of the heterogeneous nickel-based catalyst on the aluminum oxide support. The crystallite size of the heterogeneous nickel-based catalyst on the aluminum oxide support is analyzed by using the X-ray diffraction (XRD). The particle size and the morphology of the heterogeneous nickel-based catalyst on the aluminum oxide support are analyzed by using the field emission scanning electron microscope (FESEM). The metal surface area and the specific surface area of the heterogeneous nickel-based catalyst on the aluminum oxide support are analyzed by using the specific surface area and porosity analyzer and the chemisorption analyzer. The activity test, the selectivity test and the stability test are performed by the aforementioned analysis.

1.1 An Effect of the Ni Concentration Loading on the Material Properties of the Ni@Al$_2$O$_3$ Example 1 to Example 4 of the present disclosure are observed the effect of the Ni concentration loading on the material properties of the Ni@Al$_2$O$_3$ by the different Ni concentrations. The controlling conditions of the Ni@Al$_2$O$_3$ are shown in Table 1, wherein $C_{Ni}$ and $C_{Ce}$ represent the concentrations of Ni and Ce, $T_{d2}$ represents the second calcining temperature, and $T_{pas}$ represents the surface passivation temperature.

TABLE 1

The controlling conditions of the Ni@Al$_2$O$_3$

| Ni@Al$_2$O$_3$ | $C_{Ni}$ (wt %) | $C_{Ce}$ (wt %) | $T_{d2}$ (° C.) | $T_{pas}$ (° C.) |
|---|---|---|---|---|
| Example 1 | 5 | 0 | 400 | N/A |
| Example 2 | 15 | 0 | 400 | N/A |
| Example 3 | 25 | 0 | 400 | N/A |
| Example 4 | 40 | 0 | 400 | N/A |

Figure 3A:
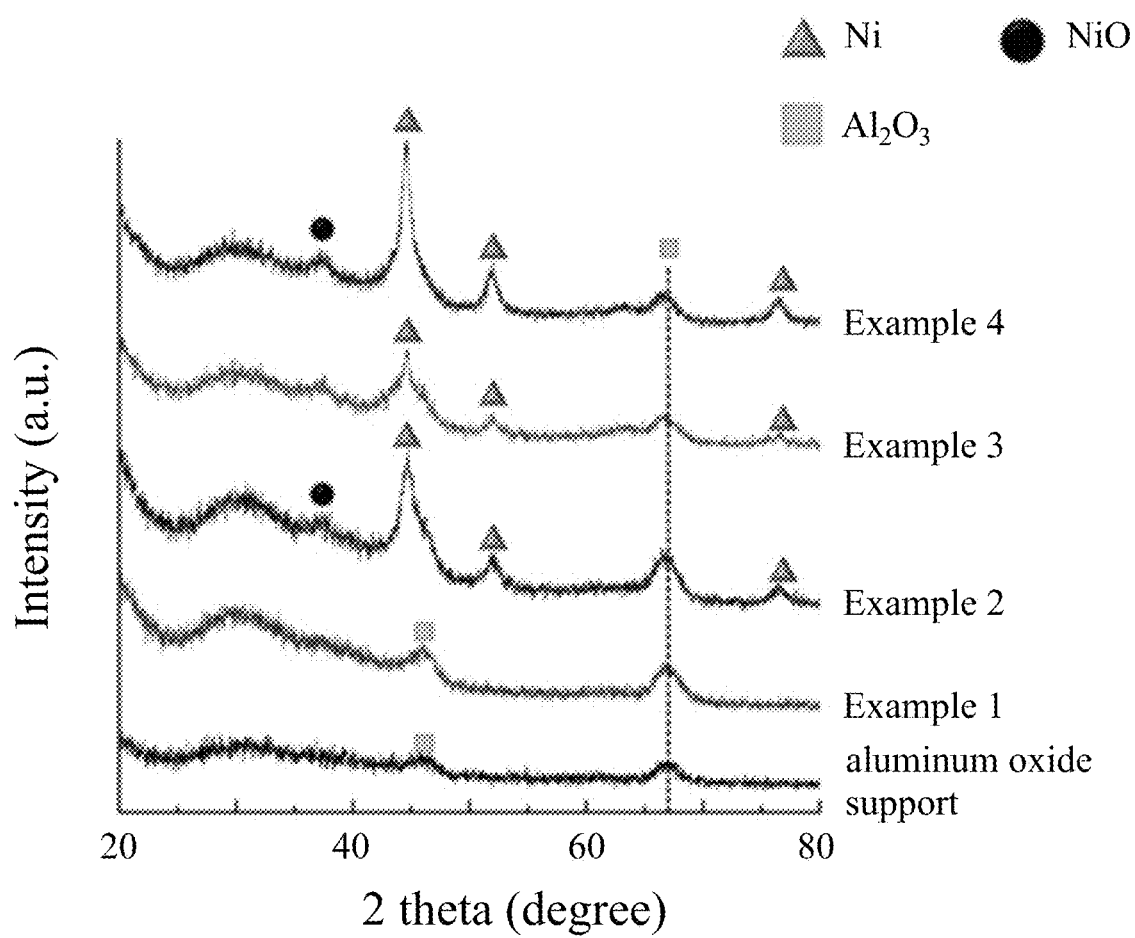
FIG. 3A is an XRD diffractogram of the Ni@$Al_2O_3$ with the different Ni concentrations.
Figure 3B:
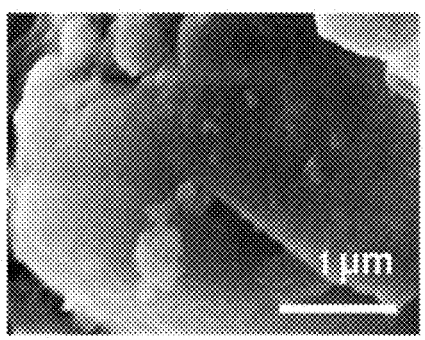
FIG. 3B is a FESEM image of the Ni@$Al_2O_3$ with the different Ni concentrations.
Figure 3B:
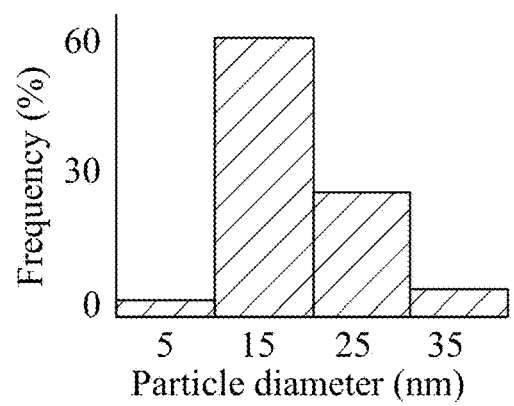
Figure 3B:
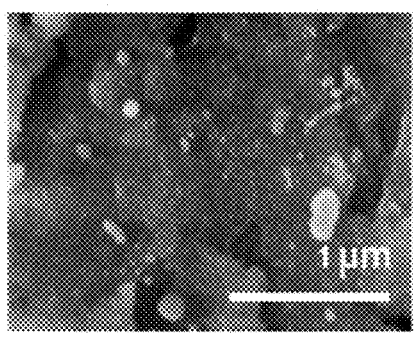
Figure 3B:
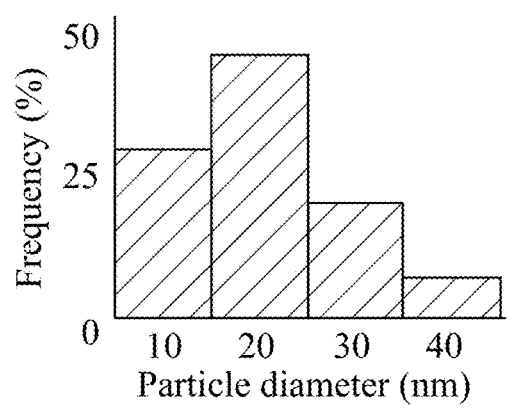
Figure 3B:
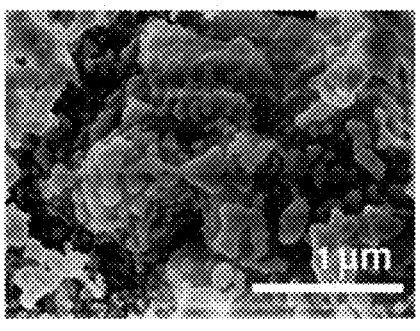
Figure 3B:
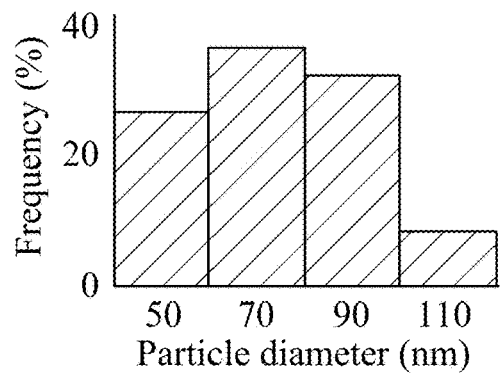
Figure 3B:
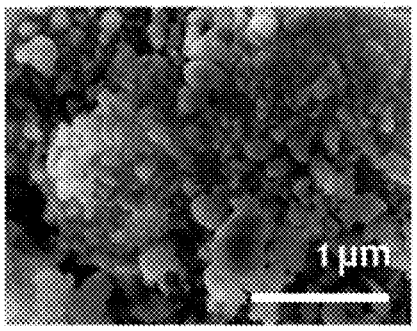
Figure 3B:
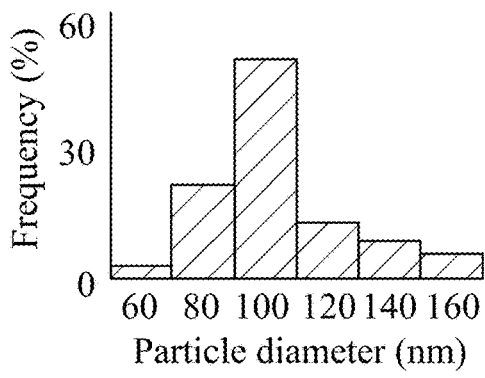

Please refer to FIGS. 3A and 3B. FIG. 3A is an XRD diffractogram of the Ni@Al$_2$O$_3$ with the different Ni concentrations. FIG. 3B is a FESEM image of the Ni@Al$_2$O$_3$ with the different Ni concentrations. As shown in FIG. 3A, the crystalline phase of metallic Ni is presented in Example 2 to Example 4, and the crystallite size of Ni ($d_{Ni}$) can be estimated by analyzing the waveform of the X-ray diffraction peak. The crystallite sizes of Ni ($d_{Ni}$) of Example 2 to Example 4 are shown in Table 2. As shown in FIG. 3B, the Ni particles are dispersed on the surface of the aluminum oxide support, and the particle sizes of Ni are obtained by the histogram analysis. The particle sizes of Ni of Example 1 to Example 4 are shown in Table 2. The results indicate that when $C_{Ni}$ increases, the $d_{Ni}$ and the particle size of Ni of the Ni@Al$_2$O$_3$ will increase. Furthermore, $C_{Ni}$ of Example 1 is too low to identify the crystalline phase and crystallite size of Ni by XRD diffraction.

TABLE 2

The crystallite sizes and the particle sizes of Ni of the Ni@Al$_2$O$_3$

| Ni@Al$_2$O$_3$ | $d_{Ni}$ (nm) | particle size of Ni (nm) |
|---|---|---|
| Example 1 | N/A | 16.4 |
| Example 2 | 5.3 | 25.8 |
| Example 3 | 7.2 | 80.1 |
| Example 4 | 10.1 | 101.8 |

Furthermore, the analysis of the specific surface area ($S_{BET}$), the pore size ($d_{pore}$) and the metal surface area ($S_{msa}$) of Example 1 to Example 4 are shown in Table 3. As shown in Table 3, by increasing $C_{Ni}$, the specific surface area of the Ni@Al$_2$O$_3$ is deceased from 192.8 m$^2$/g to 105.6 m$^2$/g, and the metal surface area is increased from 2.0±0.6 m$^2$/g to 4.4 m$^2$/g. However, when $C_{Ni}$ is increased to 40 wt %, the metal surface area is decreased to 0.88±0.06 m$^2$/g substantially. The results indicate that the decrease of the specific surface area is attributed to the increase of $C_{Ni}$ so as to cause the deposition of Ni in the mesoporous of the aluminum oxide support. Furthermore, in the case of the high concentration of Ni, such as $C_{Ni}$=40 wt %, the specific surface area in the mesoporous of the aluminum oxide support is decreased, resulting in the less amount of CO adsorbed to the catalyst, so that the metal surface area is deceased.

TABLE 3

The specific surface area, the pore size and the metal surface area of the Ni@Al$_2$O$_3$

| Ni@Al$_2$O$_3$ | $S_{BET}$ (m$^2$/g) | $d_{pore}$ (nm) | $S_{msa}$ (m$^2$/g) |
|---|---|---|---|
| Example 1 | 192.8 | 12.6 | 2.0 ± 0.6 |
| Example 2 | 178.7 | 11.2 | 4.1 |
| Example 3 | 166.0 | 11.0 | 4.4 |
| Example 4 | 105.6 | 10.8 | 0.88 ± 0.06 |

Figure 4:
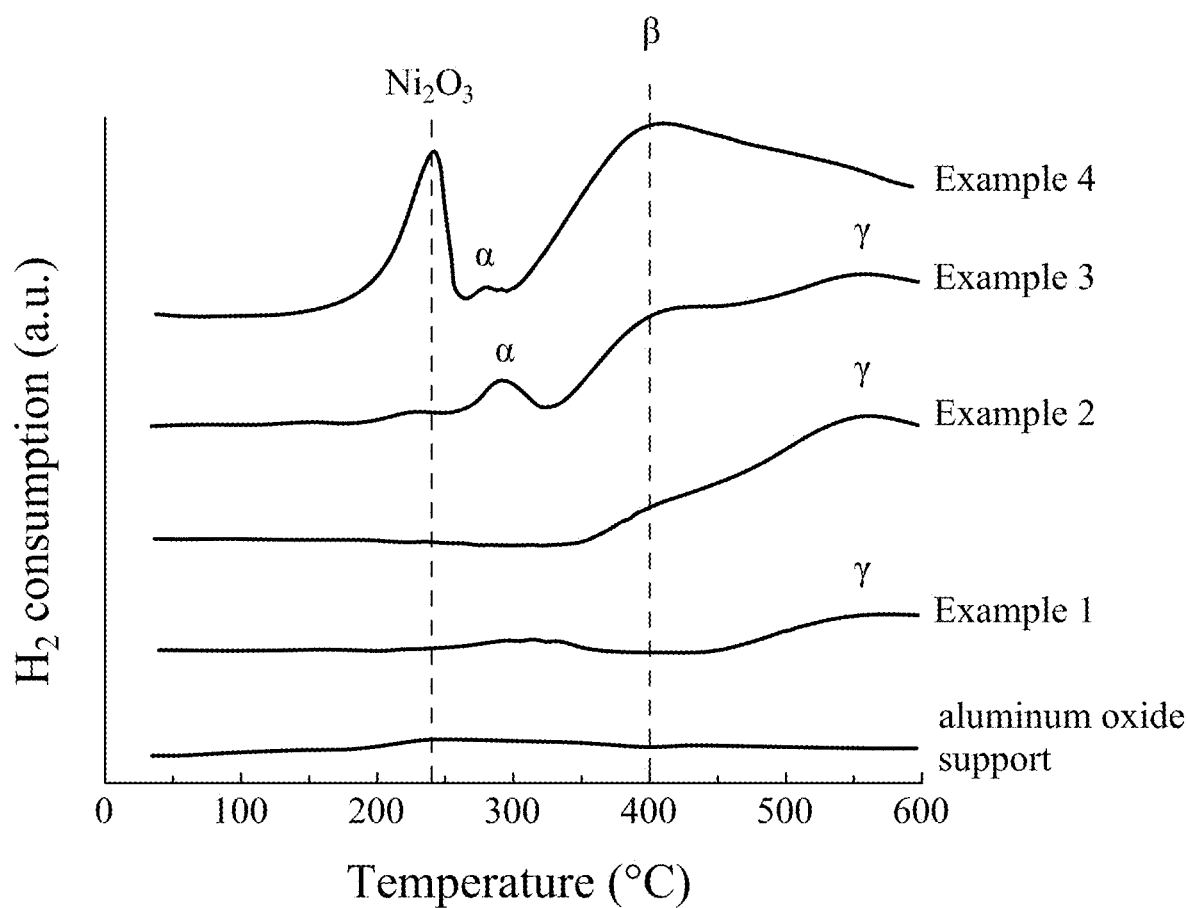
FIG. 4 is a $H_2$-TPR profile of the Ni@$Al_2O_3$ with the different Ni concentrations.

Please refer to FIG. 4, which is a H$_2$-TPR profile of the Ni@Al$_2$O$_3$ with the different Ni concentrations. As shown in FIG. 4, four types of the reduction peaks are identified as a $Ni_2O_3$ peak, an α peak, a β peak and a γ peak. The first reduction peak located at $T_{sur}$=240° C. is the $Ni_2O_3$ peak. The second reduction peak located at $T_{sur}$=300° C. is the α peak, that is, the surface of NiO is bound to oxygen and dispersed at the surface of the aluminum oxide support. The third reduction peak located at $T_{sur}$=400° C. is the β peak, that is attributed to the reduction of oxygen in the surface of NiO. The fourth reduction peak located at $T_{sur}$=600° C. is the γ peak, that is attributed to the reduction of the bulk oxygen of the NiO particle. The results indicate that increasing $C_{Ni}$ can increase the amount of oxygen on the surface of the catalyst, and can be confirmed by the peak area of the $Ni_2O_3$ peak, the α peak and the β peak.

1.2 An Effect of the Ce Concentration Loading on the Material Properties of the Ni—$CeO_2$@$Al_2O_3$ Example 5 to Example 8 of the present disclosure are based on the 15 wt % Ni concentration, and the Ce concentration is adjusted to observe the effect of the Ce concentration loading on the material properties of the Ni—$CeO_2$@$Al_2O_3$. The controlling conditions of the Ni—$CeO_2$@$Al_2O_3$ are shown in Table 4, and Comparative Example 1 of Table 4 is the $CeO_2$@$Al_2O_3$. The $CeO_2$@$Al_2O_3$ is without adding Ni and used for comparing Example 5 to Example 8, wherein $C_{Ni}$ and $C_{Ce}$ represent the concentrations of Ni and Ce, $T_{d2}$ represents the second calcining temperature, and $T_{pas}$ represents the surface passivation temperature.

TABLE 4

The controlling conditions of the Ni—$CeO_2$@$Al_2O_3$

| Ni—$CeO_2$@$Al_2O_3$ | $C_{Ni}$ (wt %) | $C_{Ce}$ (wt %) | $T_{d2}$ (° C.) | $T_{pas}$ (° C.) |
|---|---|---|---|---|
| Example 5 | 15 | 2.5 | 400 | N/A |
| Example 6 | 15 | 7.5 | 400 | N/A |
| Example 7 | 15 | 15 | 400 | N/A |
| Example 8 | 15 | 25 | 400 | N/A |
| Comparative Example 1 | 0 | 7.5 | 400 | N/A |

Figure 5A:
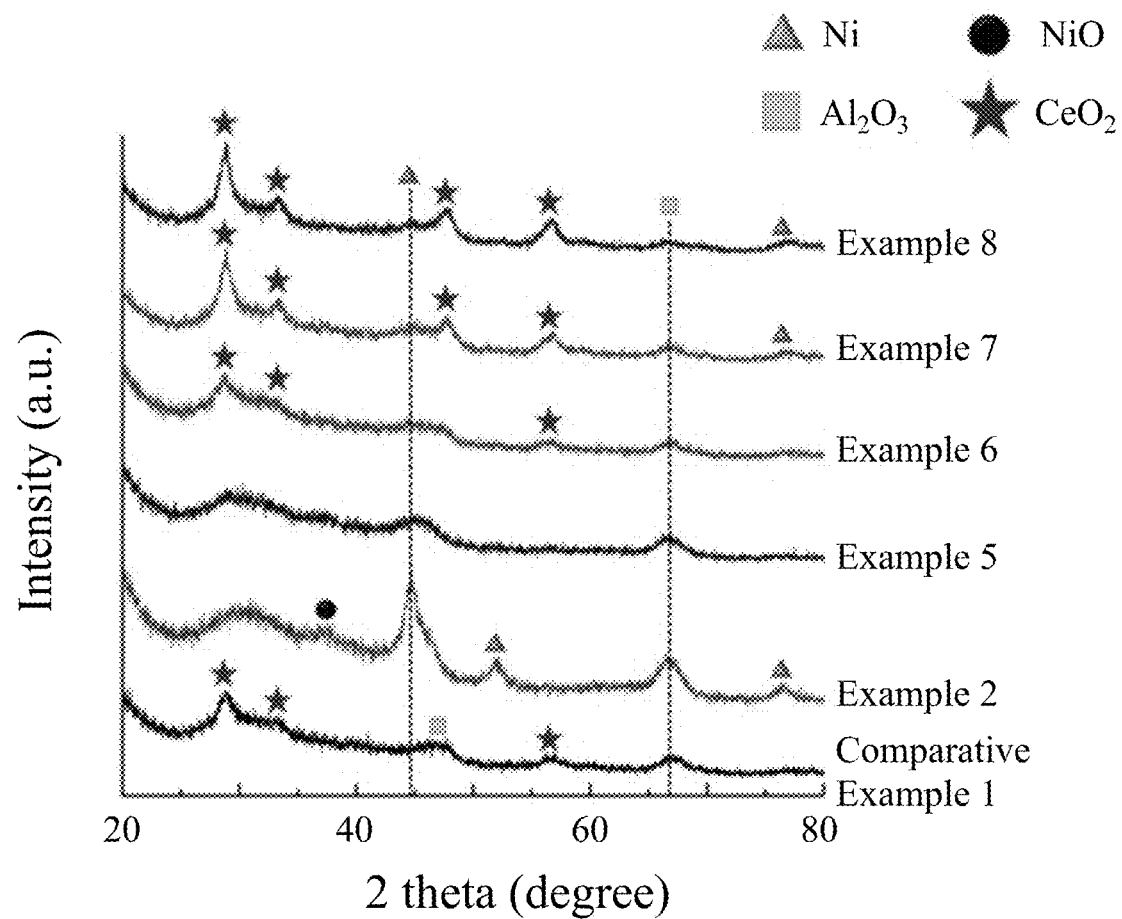
FIG. 5A is an XRD diffractogram of the Ni—$CeO_2$@$Al_2O_3$ with the different Ce concentrations.
Figure 5B:
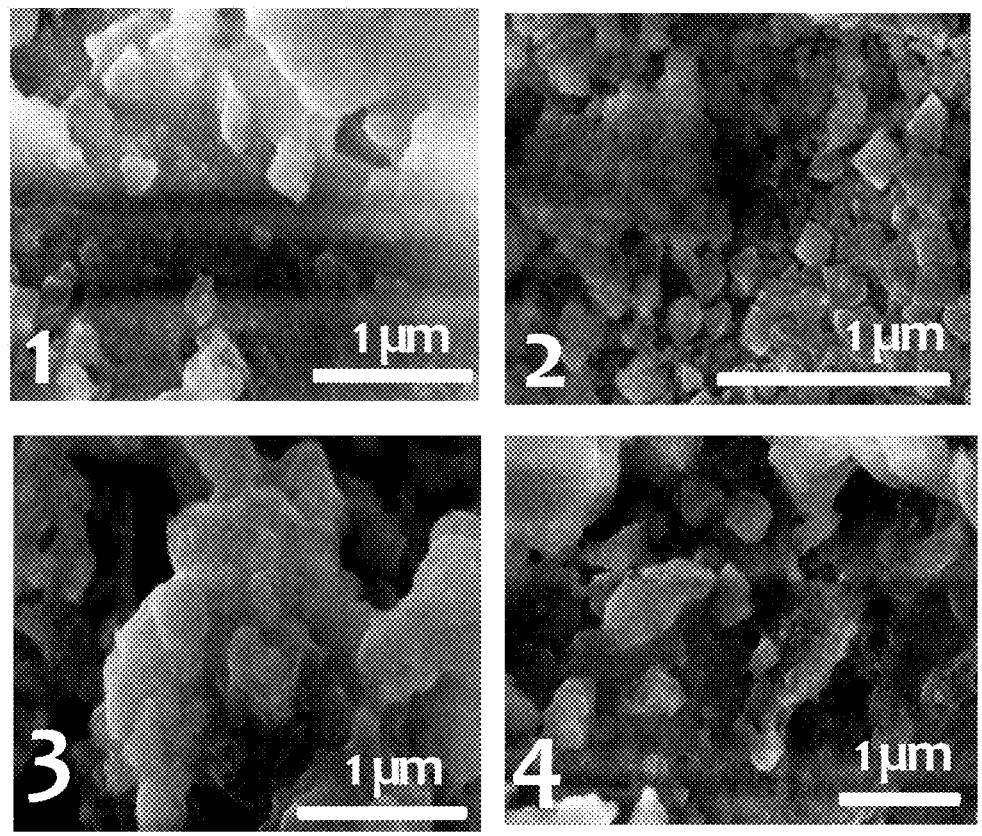
FIG. 5B is a FESEM image of the Ni—$CeO_2$@$Al_2O_3$ with the different Ce concentrations.

Please refer to FIGS. 5A and 5B. FIG. 5A is an XRD diffractogram of the Ni—$CeO_2$@$Al_2O_3$ with the different Ce concentrations. FIG. 5B is a FESEM image of the Ni—$CeO_2$@$Al_2O_3$ with the different Ce concentrations. As shown in FIG. 5A, the crystalline phase of metallic Ni is presented in Example 2 and Example 5 to Example 8, while the crystalline phase of $CeO_2$ is presented in Example 6 to Example 8 and Comparative Example 1. The crystallite sizes of $CeO_2$ ($d_{CeO2}$) of Example 5 to Example 8 and Comparative Example 1 are shown in Table 5. As shown in FIG. 5B, the Ni—$CeO_2$ particles are dispersed on the surface of the aluminum oxide support evenly, wherein 1 to 4 are the Ni—$CeO_2$@$Al_2O_3$ of Example 5 to Example 8, respectively. The results indicate that when $C_{Ce}$ increases, the $d_{CeO2}$ of the Ni—$CeO_2$@$Al_2O_3$ will increase. The $d_{Ni}$ is maintained at 5.3±0.1 nm, and proved that the addition of $CeO_2$ does not affect the $d_{Ni}$. Furthermore, $C_{Ce}$ of Example 5 is too low to identify the crystalline phase and crystallite size of $CeO_2$ by XRD diffraction.

TABLE 5

The crystallite sizes of $CeO_2$ of the Ni—$CeO_2$@$Al_2O_3$

| Ni—$CeO_2$@$Al_2O_3$ | $d_{CeO2}$ (nm) |
|---|---|
| Example 5 | N/A |
| Example 6 | 4.1 |
| Example 7 | 15.1 |
| Example 8 | 15.3 |

Furthermore, the analysis of the specific surface area ($S_{BET}$), the pore size ($d_{pore}$) and the metal surface area ($S_{msa}$) of Example 5 to Example 8 are shown in Table 6. As shown in Table 6, $C_{Ni}$ is maintained at 15 wt % and by increasing $C_{Ce}$, the specific surface area of the Ni—$CeO_2$@$Al_2O_3$ is deceased from 182.9 $m^2$/g to 112.7 $m^2$/g, and the metal surface area is deceased from 3.4±0.56 $m^2$/g to 1.8 $m^2$/g. The results indicate that the decrease of the specific surface area is attributed to the increase of $C_{Ce}$ so as to cause the deposition of Ce in the mesoporous of the aluminum oxide support. Furthermore, in the case of the addition of $CeO_2$, the specific surface area in the mesoporous of the aluminum oxide support is decreased, resulting in the less amount of CO adsorbed to the catalyst, so that the metal surface area is deceased.

TABLE 6

The specific surface area, the pore size and the metal surface area of the Ni—$CeO_2$@$Al_2O_3$

| Ni—$CeO_2$@$Al_2O_3$ | $S_{BET}$ ($m^2$/g) | $d_{pore}$ (nm) | $S_{msa}$ ($m^2$/g) |
|---|---|---|---|
| Example 5 | 182.9 | 11.8 | 3.4 ± 0.56 |
| Example 6 | 159.8 | 12.0 | 2.8 |
| Example 7 | 132.3 | 11.2 | 1.9 |
| Example 8 | 112.7 | 11.0 | 1.8 |

Figure 6:
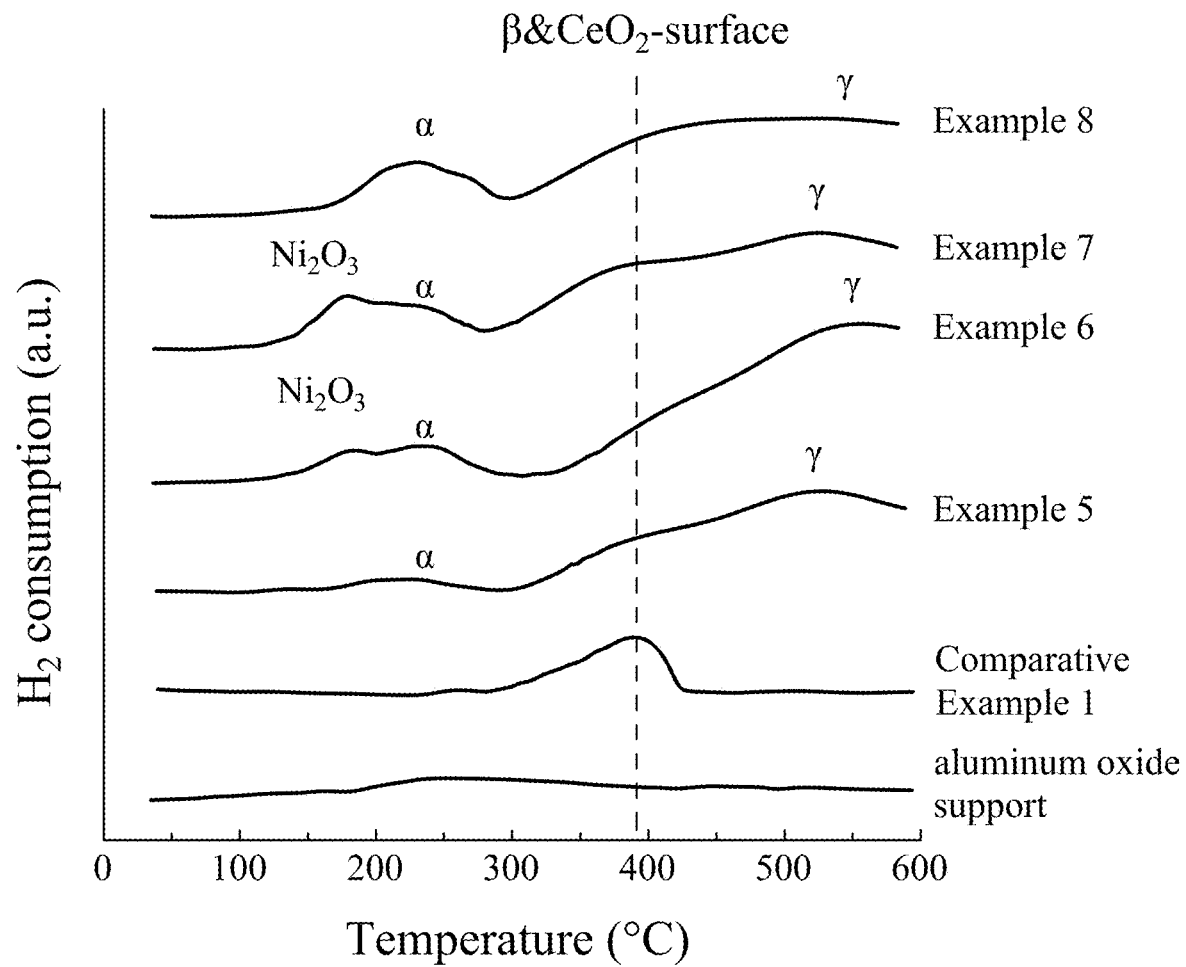
FIG. 6 is a $H_2$-TPR profile of the Ni—$CeO_2$@$Al_2O_3$ with the different Ce concentrations.

Please refer to FIG. 6, which is a $H_2$-TPR profile of the Ni—$CeO_2$@$Al_2O_3$ with the different Ce concentrations. As shown in FIG. 6, four types of the reduction peaks are identified as a $Ni_2O_3$ peak, an α peak, a β and $CeO_2$ peak and a γ peak. $T_{sur}$ of Example 5 to Example 8 in FIG. 6 is slightly lower than that of Example 1 to Example 4 in FIG. 4. Further, by increasing $C_{Ce}$, the intensity ratio of (the $Ni_2O_3$ peak+the α peak) to (the β and $CeO_2$ peak+the γ peak) is increased, indicating that the highly-dispersed NiO in the Ni—$CeO_2$@$Al_2O_3$ is increased. The results indicate that the Ni—Ce—O interface formed by adding $CeO_2$ is beneficial to improve the reducibility of Ni and is the critical factor to the catalytic performance.

1.3 An Effect of the Second Calcining Temperature and the Passivation Step on the Material Properties of the Ni@$Al_2O_3$ Example 2 and Example 9 of the present disclosure are based on the 15 wt % Ni concentration, and the second calcining temperature is adjusted to evaluate the effect of the second calcining temperature on the material properties of the Ni@$Al_2O_3$. Furthermore, Example 10 is prepared by introducing the air to perform the passivation step at 200° C. after the second calcining step of Example 3. The controlling conditions of the Ni@$Al_2O_3$ are shown in Table 7, wherein $C_{Ni}$ and $C_{Ce}$ represent the concentrations of Ni and Ce, $T_{d2}$ represents the second calcining temperature, and $T_{pas}$ represents the surface passivation temperature.

TABLE 7

| The controlling conditions of the Ni@Al$_2$O$_3$ | | | | |
|---|---|---|---|---|
| Ni@Al$_2$O$_3$ | C$_{Ni}$ (wt %) | C$_{Ce}$ (wt %) | T$_{d2}$ (° C.) | T$_{pas}$ (° C.) |
| Example 2 | 15 | 0 | 400 | N/A |
| Example 3 | 25 | 0 | 400 | N/A |
| Example 9 | 15 | 0 | 250 | N/A |
| Example 10 | 25 | 0 | 400 | 200 |

Figure 7A:
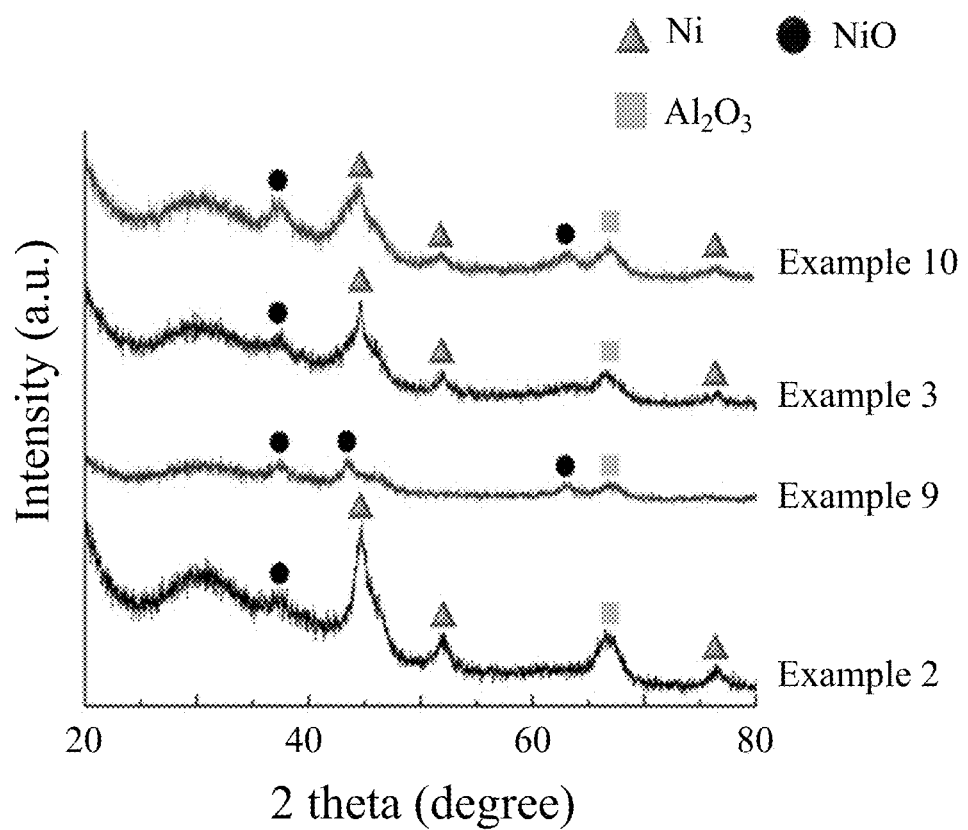
FIG. 7A is an XRD diffractogram of the Ni@$Al_2O_3$ according to Example 2, Example 3, Example 9 and Example 10 of the present disclosure.

Please refer to FIG. 7A, which is an XRD diffractogram of the Ni@Al$_2$O$_3$ according to Example 2, Example 3, Example 9 and Example 10 of the present disclosure. As shown in FIG. 7A, only the crystalline phase of NiO is presented in Example 9, and the crystallite size of NiO (d$_{NiO}$) is 8.0 nm. When T$_{d2}$ is increased to 400° C., such as Example 2, the crystalline phase of metallic Ni is presented, and the crystallite size of Ni (d$_{Ni}$) is 5.3 nm. The results indicate that when T$_{d2}$ is raised to 400° C., NiO is reduced to metallic Ni. Furthermore, the crystalline phase of metallic Ni is presented in Example 10, and the crystallite size of Ni (d$_{Ni}$) is 7.3 nm. However, the crystallite size of Ni (d$_{Ni}$) of Example 3 is 7.2 nm, proved that the passivation step does not affect the d$_{Ni}$ of Example 3.

1.4 An Effect of the Second Calcining Temperature and the Passivation Step on the Material Properties of the Ni—CeO$_2$@Al$_2$O$_3$ Example 6 and Example 11 of the present disclosure are based on the 15 wt % Ni concentration, and the 7.5 wt % Ce concentration. The second calcining temperature is adjusted to evaluate the effect of the second calcining temperature on the material properties of the Ni—CeO$_2$@Al$_2$O$_3$. Furthermore, Example 12 is prepared by introducing the air to perform the passivation step at 200° C. after the second calcining step of Example 6. The controlling conditions of the Ni—CeO$_2$@Al$_2$O$_3$ are shown in Table 8, wherein C$_{Ni}$ and C$_{Ce}$ represent the concentrations of Ni and Ce, T$_{d2}$ represents the second calcining temperature, and T$_{pas}$ represents the surface passivation temperature.

TABLE 8

| The control conditions of the Ni—CeO$_2$@Al$_2$O$_3$ | | | | |
|---|---|---|---|---|
| Ni—CeO$_2$@Al$_2$O$_3$ | C$_{Ni}$ (wt %) | C$_{Ce}$ (wt %) | T$_{d2}$ (° C.) | T$_{pas}$ (° C.) |
| Example 6 | 15 | 7.5 | 400 | N/A |
| Example 11 | 15 | 7.5 | 250 | N/A |
| Example 12 | 15 | 7.5 | 400 | 200 |

Figure 7B:
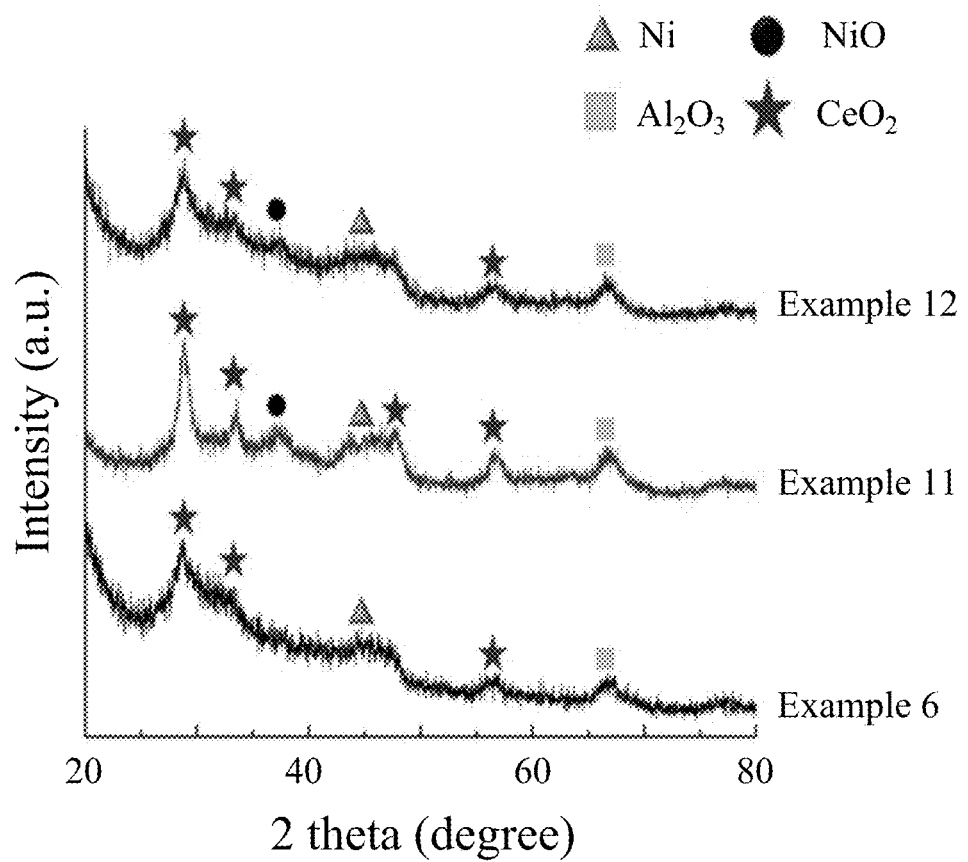
FIG. 7B is an XRD diffractogram of the Ni—$CeO_2$@$Al_2O_3$ according to Example 6, Example 11 and Example 12 of the present disclosure.

Please refer to FIG. 7B, which is an XRD diffractogram of the Ni—CeO$_2$@Al$_2$O$_3$ according to Example 6, Example 11 and Example 12 of the present disclosure. As shown in FIG. 7B, the crystalline phases of NiO and CeO$_2$ are presented in Example 11, and the crystallite sizes of NiO (d$_{NiO}$) and CeO$_2$ (d$_{CeO2}$) are 5.3 nm and 9.9 nm, respectively. When T$_{d2}$ is increased to 400° C., such as Example 6, the crystalline phase of NiO is disappeared and the crystalline phase of metallic Ni is presented, the crystallite sizes of Ni (d$_{Ni}$) and CeO$_2$ (d$_{CeO2}$) are 5.3 nm and 4.1 nm, respectively. The results indicate that when T$_{d2}$ is raised to 400° C., NiO is reduced to metallic Ni. Furthermore, the crystalline phase of NiO is presented in Example 12, the crystallite sizes of Ni (d$_{Ni}$) and NiO (d$_{NiO}$) are 5.3 nm and 4.4 nm, respectively, proved that the passivation step does not affect the d$_{Ni}$ of Example 6.

Figure 8:
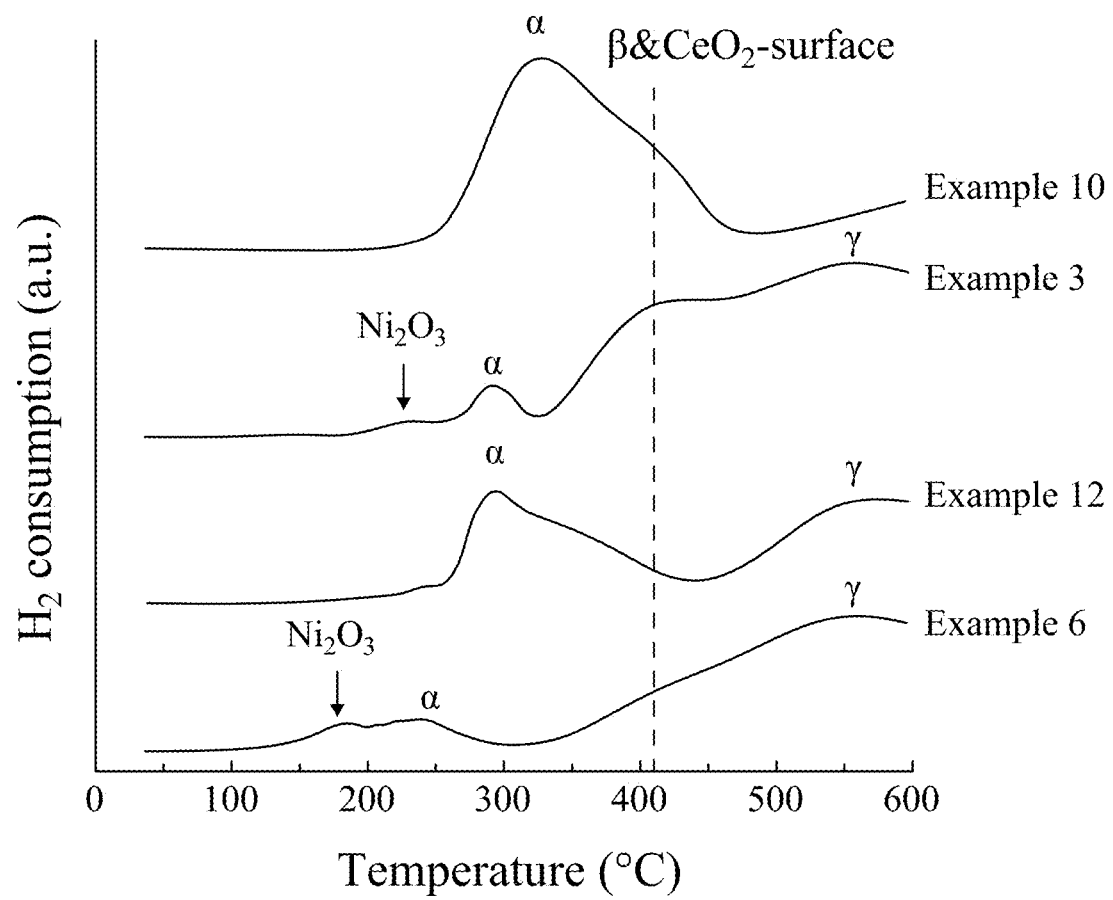
FIG. 8 is a $H_2$-TPR profile of the Ni@$Al_2O_3$ and the Ni—$CeO_2$@$Al_2O_3$ after the passivation step.

Please refer FIG. 8, which is a H$_2$-TPR profile of the Ni@Al$_2$O$_3$ and the Ni—CeO$_2$@Al$_2$O$_3$ after the passivation step. As shown in FIG. 8, four types of the reduction peaks are identified as a Ni$_2$O$_3$ peak, an α peak, a β and CeO$_2$ peak and a γ peak. T$_{sur}$ of the Ni$_2$O$_3$ peak and the α peak of Example 10 and Example 12 are higher than those of Example 3 and Example 6, respectively. The results indicate that Ni on the surface of the catalyst is changed after the second calcining step at the second calcining temperature of 400° C. followed by the passivation step.

2. Reductive Amination Reaction of Polypropylene Glycol

Figure 2:
FIG. 2 is a flow chart of a method for synthesizing polyetheramine according to another embodiment of the present disclosure.

The heterogeneous nickel-based catalyst on the aluminum oxide support of the present disclosure is performed the reductive amination reaction of polypropylene glycol step of the step 220 of the method for synthesizing polyetheramine 200 as shown in FIG. 2. In a 250 mL autoclave reaction system, the temperature is maintained at 230° C., the pressure is maintained at 1800 psi for 2 hours. Next, the feed is added, which includes 10 g polypropylene glycol, hydrogen and ammonia. The molar ratio of hydrogen to polypropylene glycol is 1.3, and the molar ratio of ammonia to polypropylene glycol is 40.6. Then, the product is heated at 130° C. of the oil bath under an atmospheric condition so as to remove water and unreacted ammonia.

Figure 9:
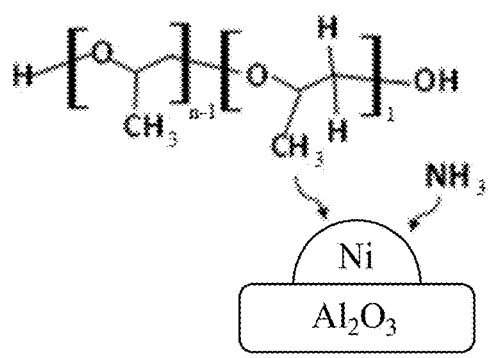
FIG. 9 is a schematic view for the reaction mechanism of the reductive amination reaction of polypropylene glycol catalyzed by the Ni@$Al_2O_3$.
Figure 9:
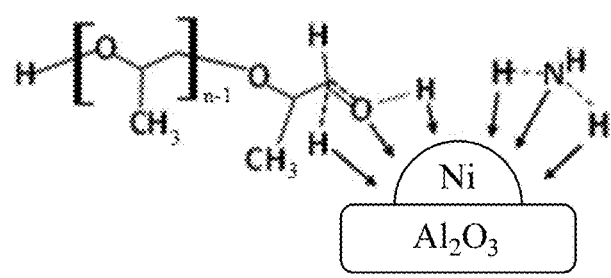
Figure 9:
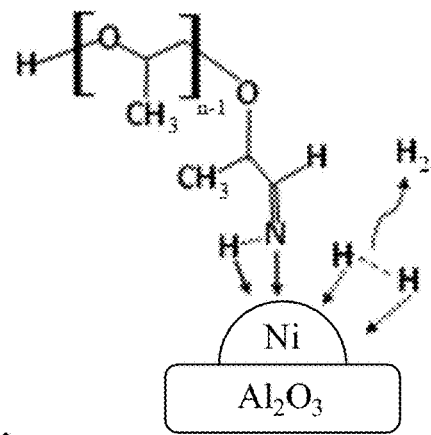
Figure 9:
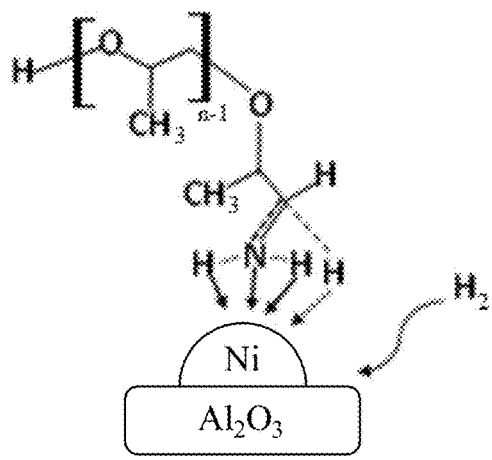
Figure 9:
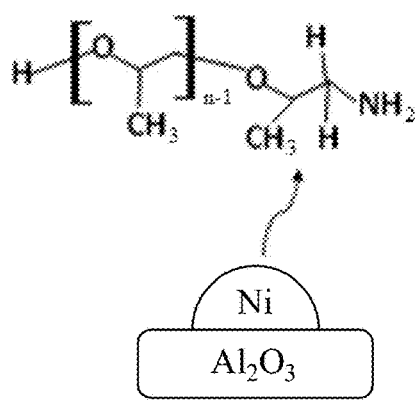

Please refer to FIG. 9, which is a schematic view for the reaction mechanism of the reductive amination reaction of polypropylene glycol catalyzed by the Ni@Al$_2$O$_3$, and includes the steps 1 to 5. The step 1: a competitive adsorption of PPG and ammonia occurs toward the surface of Ni. The step 2: the alkyl group of PPG dehydrogenates to ketone. The step 3: the dehydrogenated PPG reacts with liquid ammonia to form polyimine via the condensation reaction. The step 4: polyimine reacts with the adsorbed hydrogen to form polyetheramine. The step 5: polyetheramine is desorbed from the surface of Ni. Here, the active site of the reductive amination reaction of polypropylene glycol catalyzed by the Ni@Al$_2$O$_3$ is mainly located at the surface of Ni.

Figure 10:
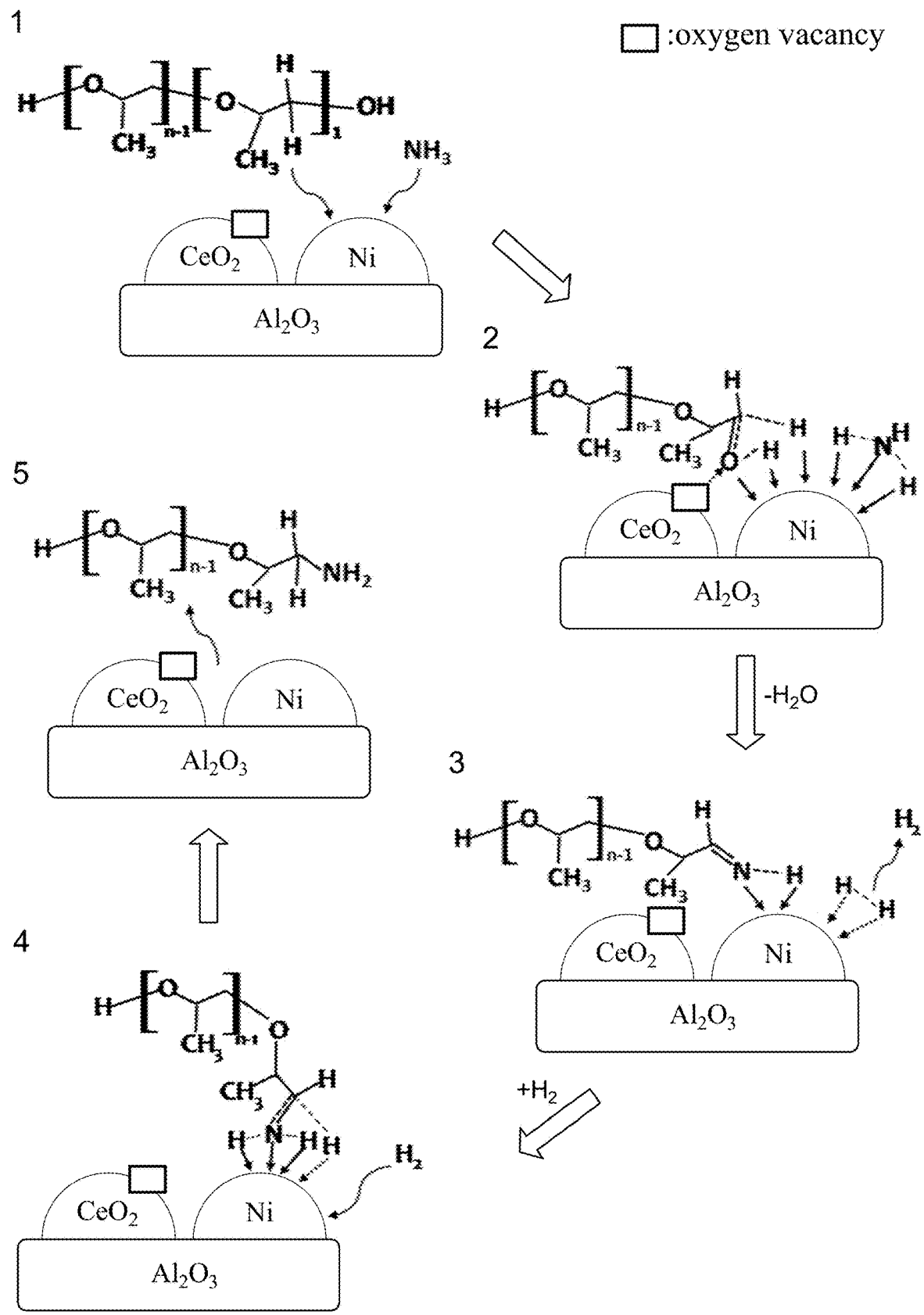
FIG. 10 is a schematic view for the reaction mechanism of the reductive amination reaction of polypropylene glycol catalyzed by the Ni—$CeO_2$@$Al_2O_3$.

Please refer to FIG. 10, which is a schematic view for the reaction mechanism of the reductive amination reaction of polypropylene glycol catalyzed by the Ni—CeO$_2$@Al$_2$O$_3$, and includes the steps 1 to 5. The step 1: PPG adsorbs to the surface of the Ni—CeO$_2$@Al$_2$O$_3$. The step 2: PPG interacts with oxygen vacancy on the surface of CeO$_2$ to promote the dehydrogenation at the interface of Ni—CeO$_2$. The step 3: ammonia simultaneously adsorbs to the surface of Ni, and after the condensation reaction, the dehydrogenated PPG reacts with liquid ammonia to form polyimine. The step 4: polyimine reacts with the adsorbed hydrogen to form polyetheramine. The step 5: polyetheramine is desorbed from the surface of Ni. Here, the interface of Ni—Ce—O provides the additional active sites for the dehydrogenation of PPG, which will reduce the impact of the strong competitive adsorption of ammonia at the surface of Ni with PPG. Besides, the desorption of polyetheramine is enhanced by CeO$_2$, and CeO$_2$ also inhibits the formation of Ni$_3$N on the surface of Ni.

Figure 11A:
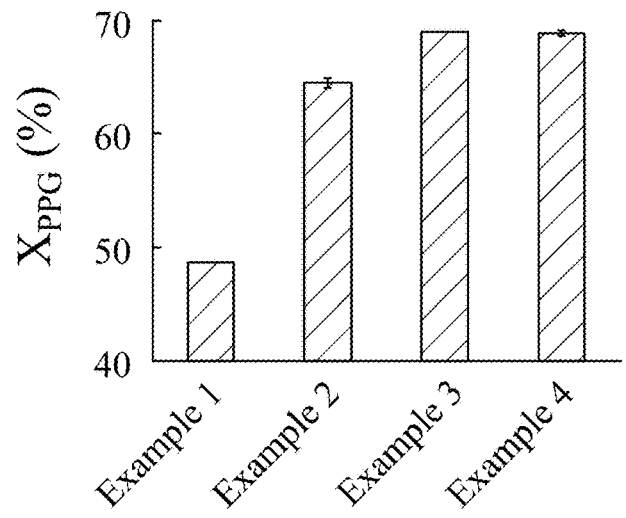
FIG. 11A is a histogram for the conversion ratio of PPG of the Ni@$Al_2O_3$ according to Example 1 to Example 4 of the present disclosure.
Figure 11B:
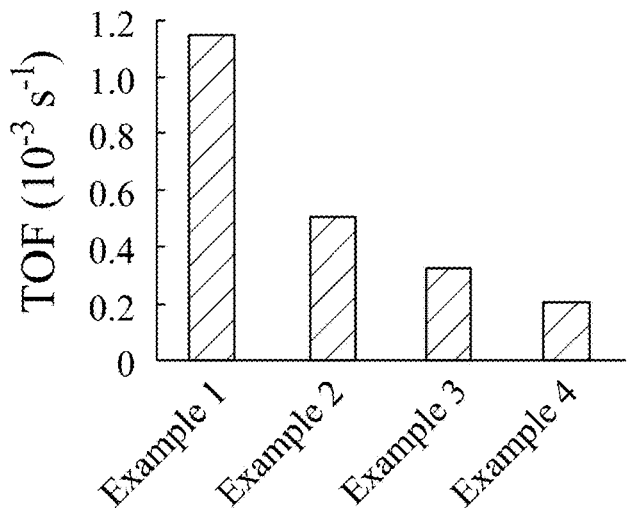
FIG. 11B is a histogram for the turnover frequency of the Ni@$Al_2O_3$ according to Example 1 to Example 4 of the present disclosure.
Figure 11C:
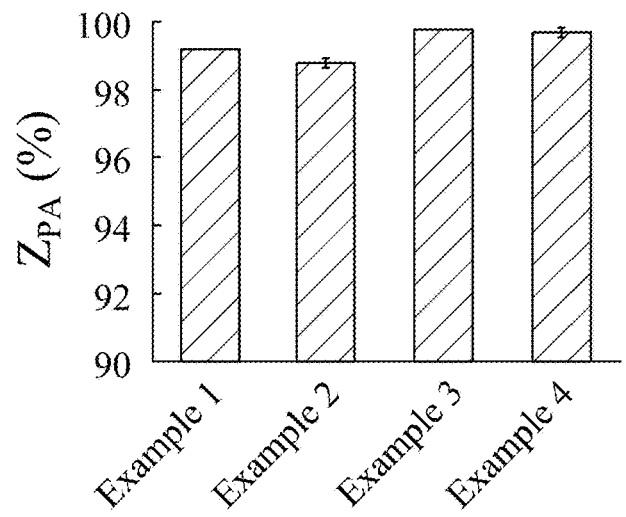
FIG. 11C is a histogram for the selectivity to primary amine of the Ni@$Al_2O_3$ according to Example 1 to Example 4 of the present disclosure.

3. The Activity Test of the Heterogeneous Nickel-Based Catalyst on the Aluminum Oxide Support 3.1 the Activity Test of the Ni@Al$_2$O$_3$ with the Ni Concentration Please refer to FIGS. 11A, 11B and 11C. FIG. 11A is a histogram for the conversion ratio of PPG of the Ni@Al$_2$O$_3$ according to Example 1 to Example 4 of the present disclosure. FIG. 11B is a histogram for the turnover frequency of the Ni@Al$_2$O$_3$ according to Example 1 to Example 4 of the present disclosure. FIG. 11C is a histogram for the selectivity to primary amine of the Ni@Al$_2$O$_3$ according to Example 1 to Example 4 of the present disclosure. As shown in FIG. 11A, when the Ni concentration ($C_{Ni}$) is increased from 5 wt % to 40 wt %, the conversion ratio of PPG ($X_{PPG}$) is increased from 48.7% to 69.0%, and then tends to be stable. The result indicates that when $C_{Ni}$ increases, the active surface area ($S_{msa}$) of the Ni@Al$_2$O$_3$ is increased so as to cause $X_{PPG}$ increases. As shown in FIG. 11B, when the Ni concentration ($C_{Ni}$) is increased from 5 wt % to 40 wt %, the turnover frequency (TOF) of the Ni@Al$_2$O$_3$ is reduced from $1.15 \times 10^{-3}$ s$^{-1}$ to $0.20 \times 10^{-3}$ s$^{-1}$. The result indicates that when $C_{Ni}$ increases, the Ni atom per unit mass on the surface of Ni of the Ni@Al$_2$O$_3$ is decreased so as to cause TOF of the Ni@Al$_2$O$_3$ decreases. As shown in FIG. 11C, the selectivity to primary amine ($Z_{PA}$) of Example 1 to Example 4 is as high as 98.8% to 99.8%.

Figure 12A:
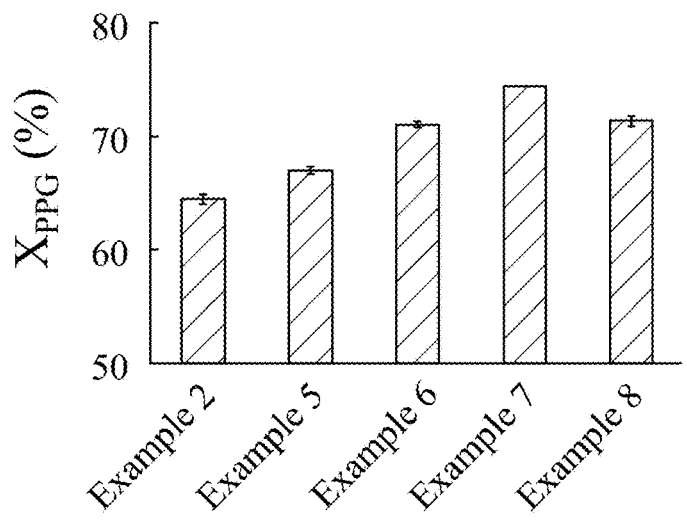
FIG. 12A is a histogram for the conversion ratio of PPG of the Ni—$CeO_2$@$Al_2O_3$ according to Example 2, Example 5 to Example 8 of the present disclosure.
Figure 12B:
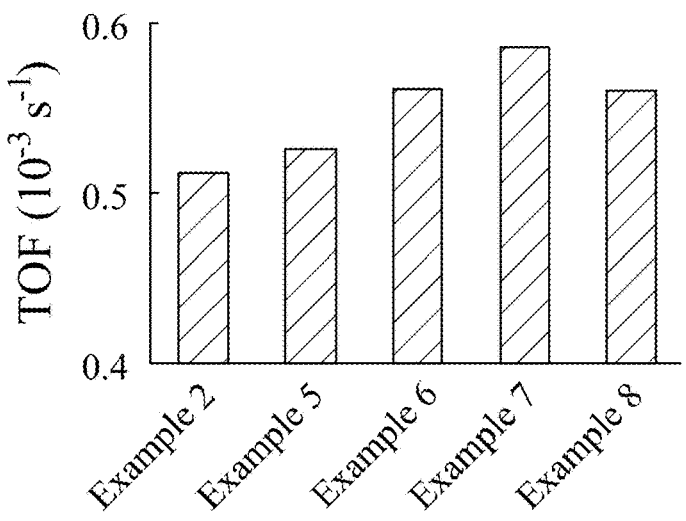
FIG. 12B is a histogram for the turnover frequency of the Ni—CeO$_2$@Al$_2$O$_3$ according to Example 2, Example 5 to Example 8 of the present disclosure.
Figure 12C:
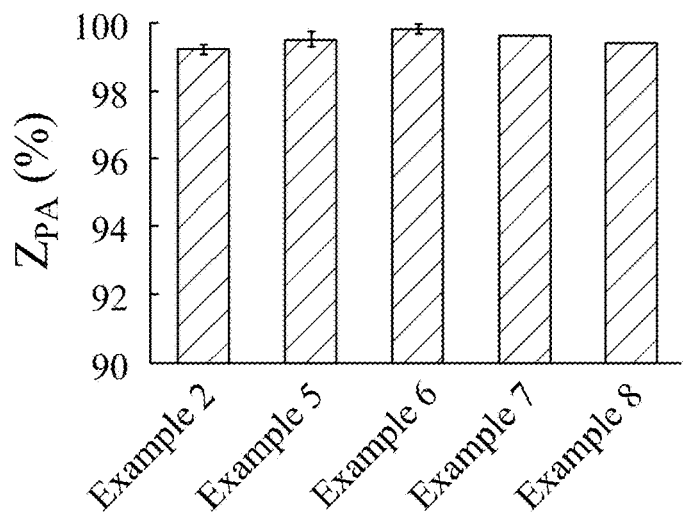
FIG. 12C is a histogram for the selectivity to primary amine of the Ni—CeO$_2$@Al$_2$O$_3$ according to Example 2, Example 5 to Example 8 of the present disclosure.

3.2 The Activity Test of the Ni—CeO$_2$@Al$_2$O$_3$ with the Ce Concentration Please refer to FIGS. 12A, 12B and 12C. FIG. 12A is a histogram for the conversion ratio of PPG of the Ni—CeO$_2$@Al$_2$O$_3$ according to Example 2, Example 5 to Example 8 of the present disclosure. FIG. 12B is a histogram for the turnover frequency of the Ni—CeO$_2$@Al$_2$O$_3$ according to Example 2, Example 5 to Example 8 of the present disclosure. FIG. 12C is a histogram for the selectivity to primary amine of the Ni—CeO$_2$@Al$_2$O$_3$ according to Example 2, Example 5 to Example 8 of the present disclosure. As shown in FIG. 12A, when the Ce concentration ($C_{Ce}$) is increased from 0 wt % to 15 wt %, the conversion ratio of PPG ($X_{PPG}$) is increased from 64.5% to 74.4%. As shown in FIG. 12B, when the Ce concentration ($C_{Ce}$) is increased from 0 wt % to 15 wt %, the turnover frequency (TOF) of the Ni—CeO$_2$@Al$_2$O$_3$ is increased from $0.51 \times 10^{-3}$ s$^{-1}$ to $0.59 \times 10^{-3}$ s$^{-1}$. The result indicates that when $C_{Ce}$ is less than or equal to 15 wt %, the catalytic activity of the Ni—CeO$_2$@Al$_2$O$_3$ is proportional to $C_{Ce}$. Therefore, the CeO$_2$ co-catalyst is added to form the interface of Ni—Ce—O, which provides a synergistic reaction to promote the desorption of PEA and enhances the activity of the Ni—CeO$_2$@Al$_2$O$_3$. As shown in FIG. 12C, the selectivity to primary amine ($Z_{PA}$) of Example 5 to Example 8 is as high as 99.5% to 100%. Furthermore, $X_{PPG}$ and TOF of the Ni—CeO$_2$@Al$_2$O$_3$ are decreased when $C_{Ce}$ increased from 15 wt % to 25 wt %, which is attributed to the excessive loading of CeO$_2$ on the surface of the Ni—CeO$_2$@Al$_2$O$_3$.

Figure 13A:
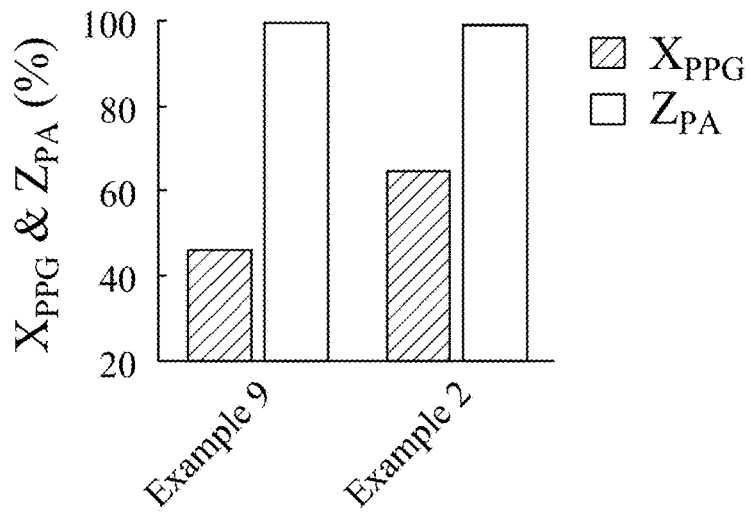
FIG. 13A is a histogram for the conversion ratio of PPG and the selectivity to primary amine of the Ni@Al$_2$O$_3$ according to Example 2 and Example 9 of the present disclosure.
Figure 13B:
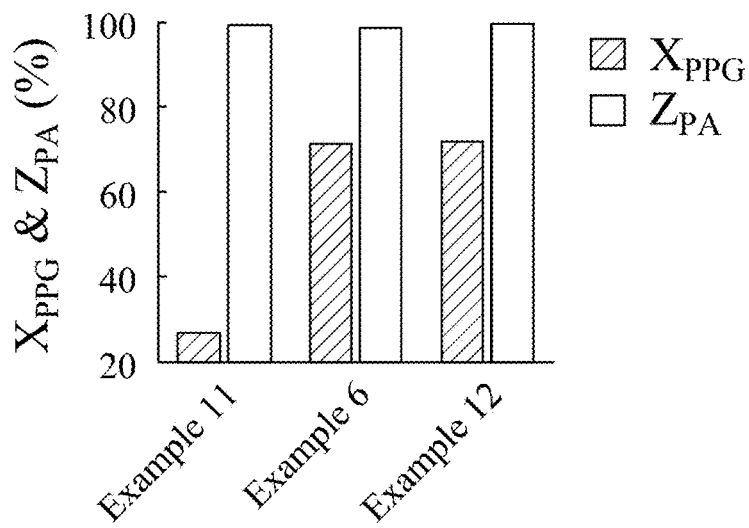
FIG. 13B is a histogram for the conversion ratio of PPG and the selectivity to primary amine of the Ni—CeO$_2$@Al$_2$O$_3$ according to Example 6, Example 11 and Example 12 of the present disclosure.
Figure 13C:
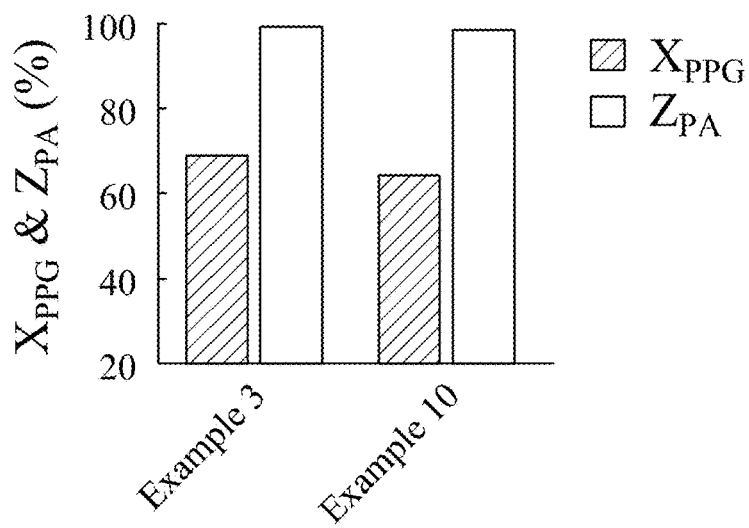
FIG. 13C is a histogram for the conversion ratio of PPG and the selectivity to primary amine of the Ni@Al$_2$O$_3$ according to Example 3 and Example 10 of the present disclosure.

3.3 The Activity Test of the Nickel-Based Catalyst on the Aluminum Oxide Support with the Second Calcining Temperature Please refer to FIGS. 13A, 13B and 13C. FIG. 13A is a histogram for the conversion ratio of PPG and the selectivity to primary amine of the Ni@Al$_2$O$_3$ according to Example 2 and Example 9 of the present disclosure. FIG. 13B is a histogram for the conversion ratio of PPG and the selectivity to primary amine of the Ni—CeO$_2$@Al$_2$O$_3$ according to Example 6, Example 11 and Example 12 of the present disclosure. FIG. 13C is a histogram for the conversion ratio of PPG and the selectivity to primary amine of the Ni@Al$_2$O$_3$ according to Example 3 and Example 10 of the present disclosure. As shown in FIG. 13A, when the second calcining temperature of the Ni@Al$_2$O$_3$ is decreased from 400° C. to 250° C., $X_{PPG}$ is decreased from 64.8% to 46.2%. As shown in FIG. 13B, when the second calcining temperature of the Ni—CeO$_2$@Al$_2$O$_3$ is decreased from 400° C. to 250° C., $X_{PPG}$ is decreased from 71.2% to 26.7%. The results indicate that the oxidation state of the active compound is a critical factor to catalyze the reductive amination reaction. As shown in FIG. 13C, $X_{PPG}$ of Example 10 is close to $X_{PPG}$ of Example 3, and $X_{PPG}$ of Example 12 is close to $X_{PPG}$ of Example 6. The results indicate that the surface passivation of the catalyst will not reduce the activity of the catalyst, and the $Z_{PA}$ is also as high as 98% to 100%.

Figure 14A:
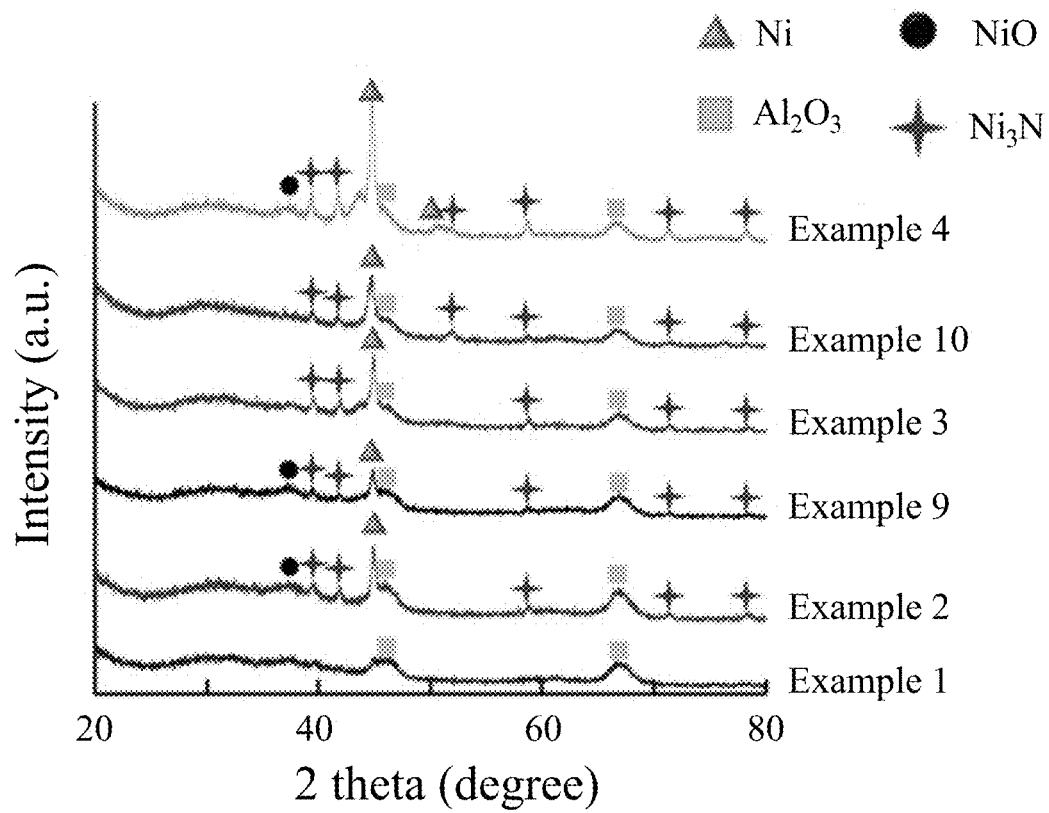
FIG. 14A is an XRD diffractogram of the Ni@Al$_2$O$_3$ after the reductive amination reaction.
Figure 14B:
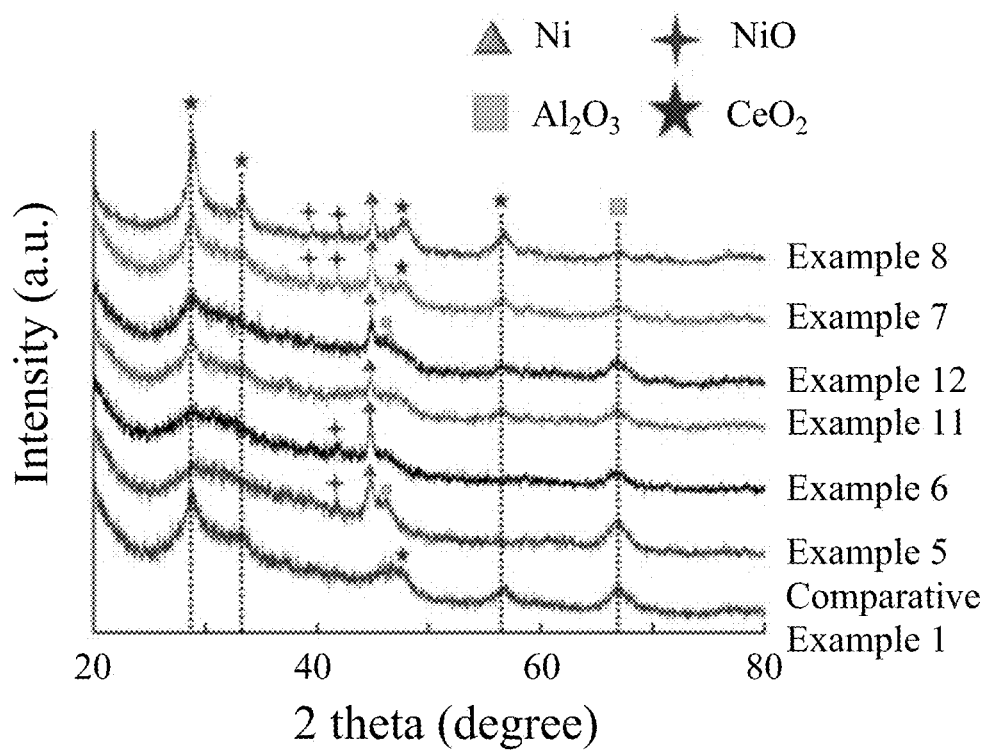
FIG. 14B is an XRD diffractogram of the Ni—CeO$_2$@Al$_2$O$_3$ after the reductive amination reaction.

4. The Stability Test of the Heterogeneous Nickel-Based Catalyst on the Aluminum Oxide Support Please refer to FIGS. 14A and 14B. FIG. 14A is an XRD diffractogram of the Ni@Al$_2$O$_3$ after the reductive amination reaction. FIG. 14B is an XRD diffractogram of the Ni—CeO$_2$@Al$_2$O$_3$ after the reductive amination reaction. As shown in FIG. 14A, the crystalline phase of metallic Ni is presented in Example 2 to Example 4, Example 9 and Example 10, and the crystallite sizes of Ni ($d_{Ni}$) of Example 2 to Example 4 are 28.1 nm, 26.4 nm and 24.9 nm, respectively. The results indicate that after the reductive amination reaction, the crystallite sizes of Example 2 to Example 4 are increased, and showing the sintering of Ni. Furthermore, the crystalline phase of Ni$_3$N is presented in Example 2, Example 4, Example 9 and Example 10, and the crystallite sizes of Ni$_3$N ($d_{Ni3N}$) are between 9.4 nm and 10.5 nm, which is attributed to the strong adsorption of ammonia on the metal surface especially in a hydrogen-deficient condition. However, during the reaction, the nitridation reaction is considered as a catalyst deactivation pathway, which reduces the yield and the selectivity by the generation of unwanted side products.

As shown in FIG. 14B, the crystalline phase of metallic Ni and CeO$_2$ are presented in Example 5 to Example 8, Example 11 and Example 12, and the crystallite sizes of Ni ($d_{Ni}$) of Example 5 to Example 8 are 15.9 nm, 25.0 nm, 17.7 nm and 18.5 nm, respectively. The results indicate that after the reductive amination reaction, the crystallite sizes of Example 5 to Example 8 are increased, and showing the sintering of Ni. However, the extent of sintering is significantly reduced through the addition of CeO$_2$ compared with the crystallite sizes of the Ni@Al$_2$O$_3$. Furthermore, the crystalline phase of Ni$_3$N is unable to clearly identified in Example 5 to Example 8, Example 11 and Example 12. Note that the addition of CeO$_2$ will inhibit the formation of Ni$_3$N.

Figure 15A:
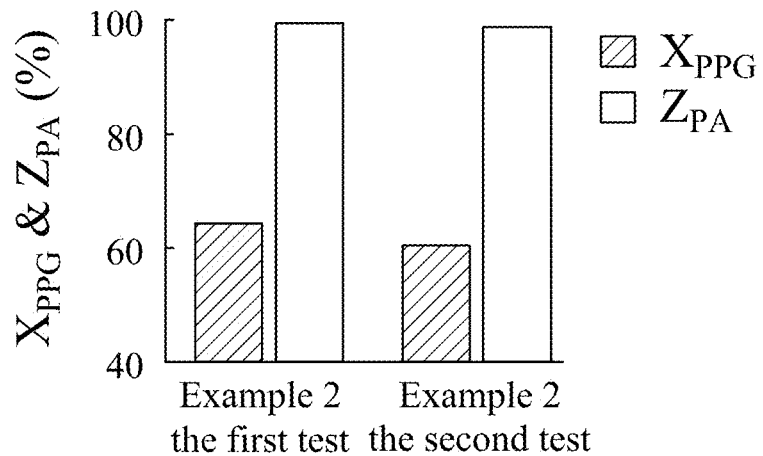
FIG. 15A is a histogram for the conversion ratio of PPG and the selectivity to primary amine from the first and the second test according to Example 2 of the present disclosure.
Figure 15B:
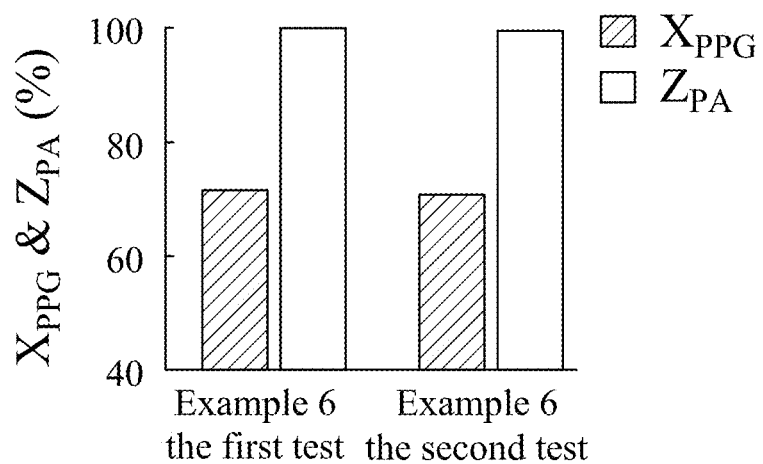
FIG. 15B is a histogram for the conversion ratio of PPG and the selectivity to primary amine from the first and the second test according to Example 6 of the present disclosure.

Please refer to FIGS. 15A and 15B. FIG. 15A is a histogram for the conversion ratio of PPG and the selectivity to primary amine from the first and the second test according to Example 2 of the present disclosure. FIG. 15B is a histogram for the conversion ratio of PPG and the selectivity to primary amine from the first and the second test according to Example 6 of the present disclosure. As shown in FIG. 15A, $X_{PPG}$ of Example 2 is 60.4% after the second test, which is 6% lower than that of the first test, and $Z_{PA}$ is maintained at 99% after the second test. As shown in FIG. 15B, compared with the first test, $X_{PPG}$ of Example 6 is maintained at 70.9% after the second test, and $Z_{PA}$ is also maintained at 100% after the second test. The results indicate that the addition of CeO$_2$ will improve the stability of the Ni@Al$_2$O$_3$ to catalyze the reductive amination reaction of the polypropylene glycol, and the stability is improved by adding $CeO_2$ to inhibit the formation of $Ni_3N$ and the sintering of the crystalline phase of metallic Ni.

Furthermore, the comparison results of the heterogeneous nickel-based catalyst on the aluminum oxide support of the present disclosure and Raney nickel catalyst are shown in Table 9. Comparative Example 2 and Comparative Example 3 are the experimental results of Raney nickel catalyst under the same conditions of the synthesis method of polyetheramine of the heterogeneous nickel-based catalyst on the aluminum oxide support. As shown in Table 9, $X_{PPG}$ of the heterogeneous nickel-based catalyst on the aluminum oxide support of Example 2 and Example 6 is much higher than that of Raney nickel catalyst of Comparative Example 2 and Comparative Example 3 at the same conditions of the synthesis method of polyetheramine. The results indicate that the heterogeneous nickel-based catalyst on the aluminum oxide support of the present disclosure has the good high catalytic activity, and can be used to catalyze the reductive amination reaction of polypropylene glycol to synthesize polyetheramine.

TABLE 9

The comparison of the heterogeneous nickel-based catalyst on the aluminum oxide support and Raney nickel catalyst

|  | Example 2 | Example 6 | Comparative Example 2 | Comparative Example 3 |
|---|---|---|---|---|
| PPG feed (g) | 10 | 10 | 10 | 10 |
| Temperature (° C.) | 230 | 230 | 200 | 230 |
| Pressure (psig) | 1800 | 1800 | 1850 | 1900 |
| Reaction time (hr) | 2 | 2 | 2 | 2 |
| $NH_3$/PPG | 40.6 | 40.6 | 40.6 | 40.6 |
| $H_2$/PPG | 1.3 | 1.3 | 1.3 | 1.3 |
| Conversion (%) | 64.5 | 66.8 | 21.4 | 25.5 |
| TOF ($10^{-4}$ $s^{-1}$) | 5.10 | 5.30 | 0.42 | 0.50 |

In conclusion, the method for fabricating the heterogeneous nickel-based catalyst on the aluminum oxide support and the heterogeneous nickel-based catalyst on the aluminum oxide support thereof of the present disclosure, which can be used for catalyzing the reductive amination reaction of polypropylene glycol are provided. Through the method for fabricating the heterogeneous nickel-based catalyst on the aluminum oxide support of the present disclosure, the concentration, the composition, the second calcining temperature and the passivation temperature of the catalyst can be adjusted to improve the catalytic activity, the stability and the selectivity of the catalyst. It is effectively applied to catalyze the reductive amination reaction of polypropylene glycol so as to synthesize polyetheramine.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for fabricating a heterogeneous nickel-based catalyst on an aluminum oxide support, comprising:
    performing a solution preparation step, wherein a catalytically active precursor is used as a precursor solution, the precursor solution contains a nickel ion and a cerium ion, and a concentration of the nickel ion is 15 wt %, a concentration of the cerium ion is in a range of from greater than 5.0 wt % to 15 wt %;
    performing a drop-cast step, wherein the precursor solution is dropped on a support so as to obtain a catalyst precursor, and the support is an aluminum oxide support;
    performing a first calcining step, wherein the catalyst precursor is calcined so as to obtain an oxidation state catalyst; and
    performing a second calcining step, wherein the oxidation state catalyst is calcined under a reducing gas so as to obtain the heterogeneous nickel-based catalyst on the aluminum oxide support, the reducing gas is hydrogen, and a temperature of the second calcining step is 400° C.

2. The method for fabricating the heterogeneous nickel-based catalyst on the aluminum oxide support of claim 1, wherein the precursor solution is a mixed solution of nickel nitrate and cerium nitrate.

3. The method for fabricating the heterogeneous nickel-based catalyst on the aluminum oxide support of claim 1, wherein the support is dried at a temperature of 353 K to 393 K first, and reserved overnight.

4. The method for fabricating the heterogeneous nickel-based catalyst on the aluminum oxide support of claim 1, wherein a temperature of the first calcining step ranges from 300° C. to 400° C.

5. The method for fabricating the heterogeneous nickel-based catalyst on the aluminum oxide support of claim 1, further comprising a passivation step, wherein the passivation step is performed by introducing an air so as to passivate the heterogeneous nickel-based catalyst on the aluminum oxide support at a temperature of 180° C. to 220° C.

6. The method for fabricating the heterogeneous nickel-based catalyst on the aluminum oxide support of claim 5, wherein the passivation step further comprises cooling the heterogeneous nickel-based catalyst on the aluminum oxide support at the temperature of 200° C. to 400° C. with nitrogen.

7. A heterogeneous nickel-based catalyst on an aluminum oxide support fabricated by the method for fabricating the heterogeneous nickel-based catalyst on the aluminum oxide support of claim 1.

8. The heterogeneous nickel-based catalyst on the aluminum oxide support of claim 7, wherein the heterogeneous nickel-based catalyst on the aluminum oxide support is a nickel-cerium oxide catalyst on the aluminum oxide support.

9. A method for synthesizing polyetheramine, comprising:
    providing the heterogeneous nickel-based catalyst on the aluminum oxide support of claim 7; and
    performing a reductive amination reaction of polypropylene glycol step, wherein polypropylene glycol is reductively aminated by the heterogeneous nickel-based catalyst on the aluminum oxide support used as a catalyst so as to obtain polyetheramine in an environment containing hydrogen and ammonia.

10. The method for synthesizing polyetheramine of claim 9, wherein a molar ratio of hydrogen to polypropylene glycol ranges from 1 to 1.5.

11. The method for synthesizing polyetheramine of claim 9, wherein a molar ratio of ammonia to polypropylene glycol ranges from 38 to 40.6.

12. The method for fabricating the heterogeneous nickel-based catalyst on the aluminum oxide support of claim 1, wherein the concentration of the cerium ion is 15 wt %.

* * * * *